(12) United States Patent
Homma et al.

(10) Patent No.: US 11,087,764 B2
(45) Date of Patent: Aug. 10, 2021

(54) SPEECH RECOGNITION APPARATUS AND SPEECH RECOGNITION SYSTEM

(71) Applicant: Clarion Co., Ltd., Saitama (JP)

(72) Inventors: Takeshi Homma, Tokyo (JP); Rui Zhang, Saitama (JP); Takuya Matsumoto, Saitama (JP); Hiroaki Kokubo, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 182 days.

(21) Appl. No.: 16/348,718

(22) PCT Filed: Nov. 14, 2017

(86) PCT No.: PCT/JP2017/040998
§ 371 (c)(1),
(2) Date: May 9, 2019

(87) PCT Pub. No.: WO2018/092786
PCT Pub. Date: May 24, 2018

(65) Prior Publication Data
US 2019/0287533 A1   Sep. 19, 2019

(30) Foreign Application Priority Data

Nov. 15, 2016   (JP) .............................. JP2016-222723

(51) Int. Cl.
*G10L 15/00* (2013.01)
*G10L 15/30* (2013.01)
*G10L 15/32* (2013.01)
*G10L 15/22* (2006.01)
*G10L 15/10* (2006.01)

(52) U.S. Cl.
CPC .............. *G10L 15/30* (2013.01); *G10L 15/00* (2013.01); *G10L 15/10* (2013.01); *G10L 15/22* (2013.01);
(Continued)

(58) Field of Classification Search
CPC ......... G10L 15/00; G10L 15/01; G10L 15/02; G10L 15/10; G10L 15/32; G10L 15/20;
(Continued)

(56) References Cited

U.S. PATENT DOCUMENTS

2007/0027693 A1   2/2007   Hanazawa
2010/0004930 A1*  1/2010   Strope ..................... G10L 15/26
                                                         704/240
(Continued)

FOREIGN PATENT DOCUMENTS

JP   2007-33901 A    2/2007
JP   2007-41089 A    2/2007
(Continued)

OTHER PUBLICATIONS

Extended European Search Report issued in European Application No. 17871957.1 dated Jul. 2, 2020 (six (6) pages).
(Continued)

*Primary Examiner* — Leshui Zhang
(74) *Attorney, Agent, or Firm* — Crowell & Moring LLP

(57) ABSTRACT

A speech recognition apparatus includes a speech detection unit configured to detect a speech input by a user, an information providing unit configured to perform information provision to the user, using either first speech recognition information based on a recognition result of the speech by a first speech recognition unit or second speech recognition information based on a recognition result of the speech by a second speech recognition unit different from the first speech recognition unit, and a selection unit configured to select either the first speech recognition information or the second speech recognition information as speech recognition information to be used by the information providing unit on the basis of an elapsed time from the input of
(Continued)

the speech, and change a method of the information provision by the information providing unit.

12 Claims, 9 Drawing Sheets

(52) U.S. Cl.
CPC ........ *G10L 15/32* (2013.01); *G10L 2015/225* (2013.01)

(58) Field of Classification Search
CPC ......... G10L 15/22; G10L 15/30; G10L 21/00; G10L 21/028; G10L 2015/221; G10L 2015/225; G10L 2015/227; G10L 2015/228
USPC ..... 704/232, 275, 231, 270.1, 246, E15.001, 704/E11.001; 706/10, 11
See application file for complete search history.

(56) References Cited

U.S. PATENT DOCUMENTS

| | | | |
|---|---|---|---|
| 2010/0057450 A1 | 3/2010 | Koll | |
| 2014/0163977 A1 | 6/2014 | Hoffmeister et al. | |
| 2015/0149175 A1* | 5/2015 | Hirata | G10L 15/22 704/246 |
| 2016/0189715 A1 | 6/2016 | Nishikawa | |

FOREIGN PATENT DOCUMENTS

| | | |
|---|---|---|
| JP | 2013-64777 | 4/2013 |
| JP | 2013-88477 A | 5/2013 |
| JP | 2013-232001 A | 11/2013 |
| JP | 2014-62944 A | 4/2014 |
| JP | 2014-174485 A | 9/2014 |
| JP | 2015-102795 A | 6/2015 |
| JP | 2015-141226 A | 8/2015 |
| JP | 2016-102823 A | 6/2016 |
| JP | 2016-126330 A | 7/2016 |
| WO | WO 2011/148594 A1 | 12/2011 |

OTHER PUBLICATIONS

Japanese-language Office Action issued in Japanese Application No. 2016-222723 dated Apr. 14, 2020 with English translation (10 pages).
International Search Report (PCT/ISA/210) issued in PCT Application No. PCT/JP2017/040998 dated Jan. 30, 2018 with English translation (four (4) pages).
Japanese-language Written Opinion (PCT/ISA/237) issued in PCT Application No. PCT/JP2017/040998 dated Jan. 30, 2018 (five (5) pages).

* cited by examiner

FIG. 1
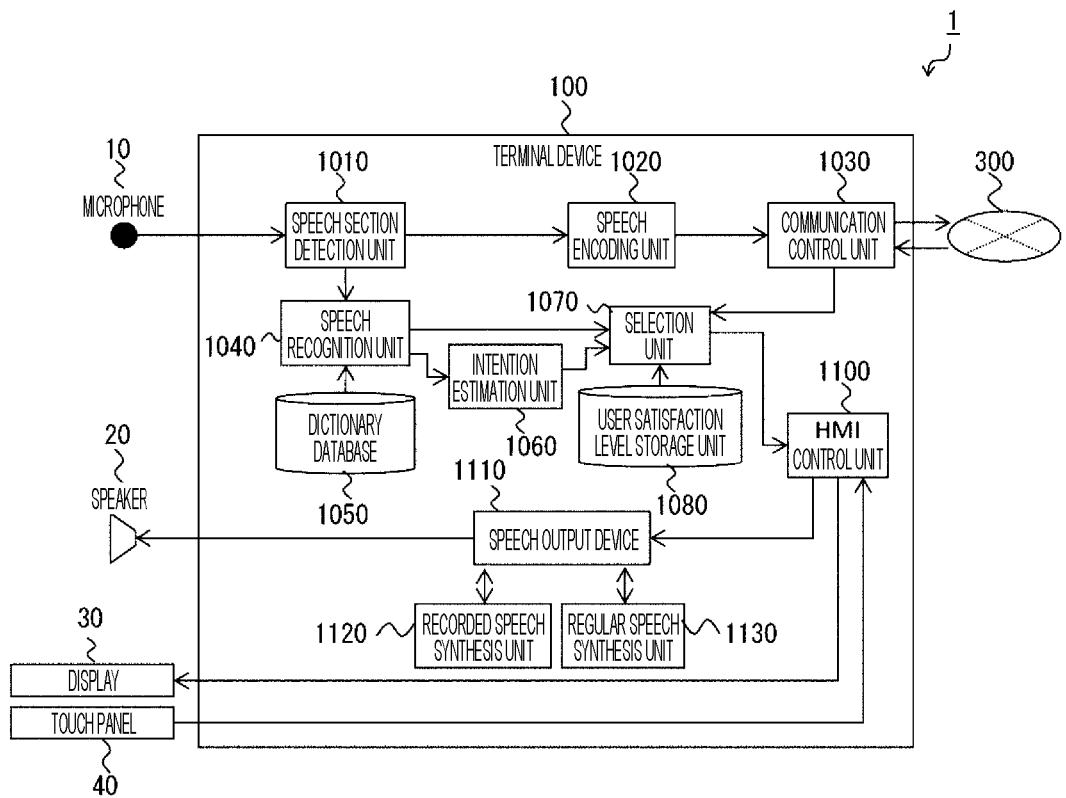
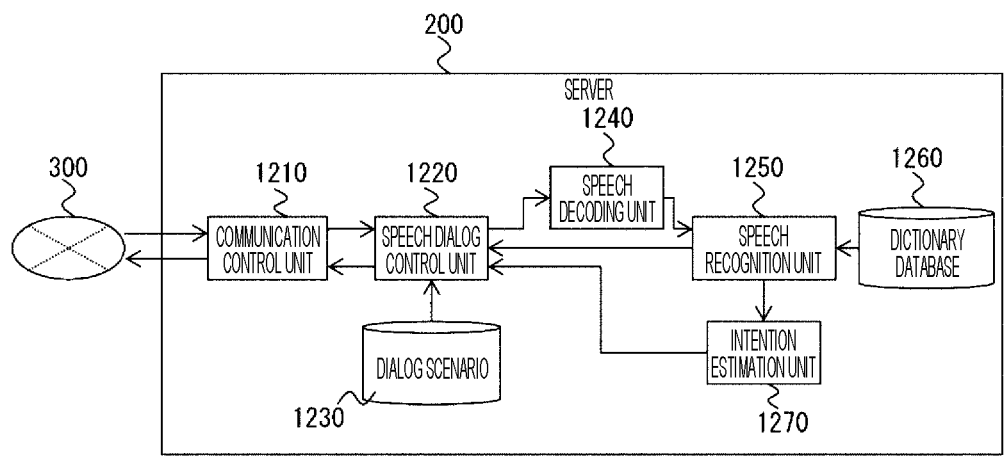

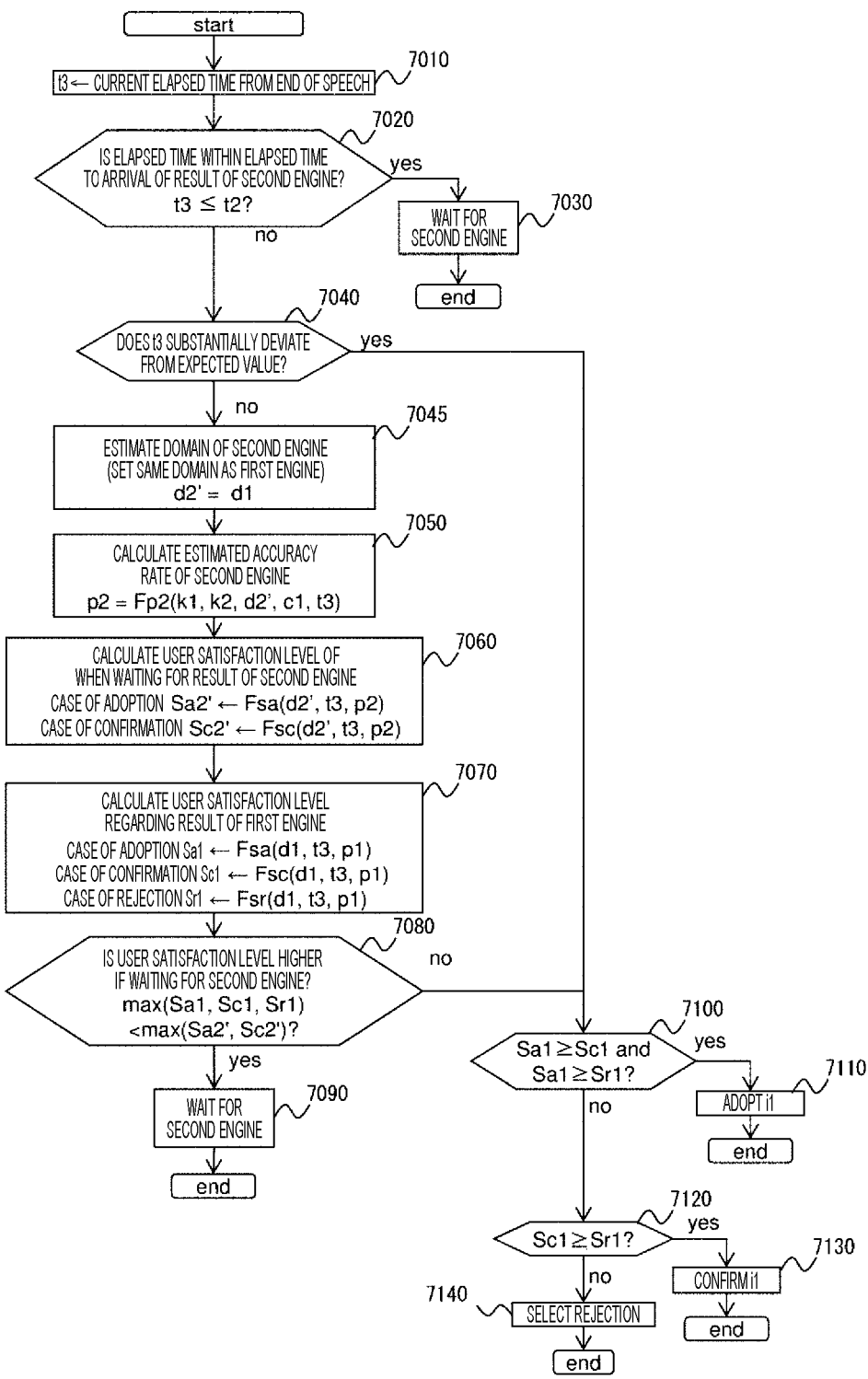

SPEECH RECOGNITION APPARATUS AND SPEECH RECOGNITION SYSTEM

TECHNICAL FIELD

The present invention relates to a speech recognition apparatus and a speech recognition system.

BACKGROUND ART

In recent years, a speech input function using a speech recognition engine has been realized in smart phones and car navigation systems. PTL 1 discloses a speech recognition system in which an in-vehicle device and a server are connected via a network, and speech recognition processing is performed by the in-vehicle device and the server in a dispersed manner using speech recognition processing units respectively mounted on the in-vehicle device and the server.

CITATION LIST

Patent Literature

PTL 1: JP 2013-88477 A

SUMMARY OF INVENTION

Technical Problem

The speech recognition system disclosed in PTL 1 selects the speech recognition processing unit of the in-vehicle device in an input mode of selecting an appropriate item from among predetermined options with a speech, such as on a menu screen, and selects the speech recognition processing unit of the server in an input mode of inputting an arbitrary text with a speech. Thus, which speech recognition processing unit is to execute the speech recognition processing is distributed according to the input mode. However, such a method of distributing the speech recognition processing may take time to make a response because the speech recognition processing unit of the server is sometimes selected even in a case where a speech sufficiently recognizable in the speech recognition processing unit of the in-vehicle device is input. Therefore, a speech input function comfortable for a user cannot be necessarily realized.

Solution to Problem

A speech recognition apparatus according to the present invention includes a speech detection unit configured to detect a speech input by a user, an information providing unit configured to perform information provision to the user, using either first speech recognition information based on a recognition result of the speech by a first speech recognition unit or second speech recognition information based on a recognition result of the speech by a second speech recognition unit different from the first speech recognition unit, and a selection unit configured to select either the first speech recognition information or the second speech recognition information as speech recognition information to be used by the information providing unit on the basis of an elapsed time from the input of the speech, and change a method of the information provision by the information providing unit.

A speech recognition system according to the present invention includes a terminal device and a server, the terminal device including a speech detection unit configured to detect a speech input by a user, a first speech recognition unit configured to execute speech recognition processing for recognizing the speech and output first speech recognition information based on a recognition result of the speech, a first communication control unit configured to transmit speech information based on the speech to the server and receive second speech recognition information transmitted from the server, an information providing unit configured to perform information provision to the user, using either the first speech recognition information or the second speech recognition information, and a selection unit configured to select either the first speech recognition information or the second speech recognition information on the basis of an elapsed time from the input of the speech and change a method of the speech provision by the information providing unit, and the server including a second communication control unit configured to receive the speech information transmitted from the terminal device and transmit the second speech recognition information to the terminal device, and a second speech recognition unit configured to execute speech recognition processing for recognizing the speech on the basis of the speech information and output the second speech recognition information based on a recognition result of the speech.

Advantageous Effects of Invention

According to the present invention, a speech input function comfortable for a user can be realized.

BRIEF DESCRIPTION OF DRAWINGS

FIG. 1 is a diagram illustrating a configuration of a speech recognition system according to an embodiment of the present invention.

FIG. 7 is a flowchart illustrating a determination routine of one result arrival.

DESCRIPTION OF EMBODIMENTS

Figure 2A:
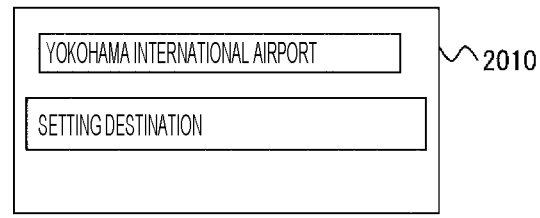
FIGS. 2A to 2D are diagrams illustrating examples of screens respectively displayed in an adoption operation, a confirmation operation, and a rejection operation.
Figure 2B:

Hereinafter, an embodiment of the present invention will be described with reference to the drawings. Note that, in the embodiment described below, a speech recognition apparatus according to the present invention will be described using an in-vehicle terminal typified by a car navigation system as an example. The present invention can also be applied to other devices having a speech input function, for example, a mobile phone, a smartphone, and a robot.

FIG. 1 is a diagram illustrating a configuration of a speech recognition system 1 according to an embodiment of the present invention. The speech recognition system 1 illustrated in FIG. 1 is configured by connecting a terminal device 100 and a server 200 via a communication network 300.

The terminal device 100 is mounted on a vehicle, for example, and includes a speech section detection unit 1010, a speech encoding unit 1020, a communication control unit 1030, a speech recognition unit 1040, a dictionary database 1050, an intention estimation unit 1060, a selection unit 1070, a user satisfaction level storage unit 1080, an HMI control unit 1100, a speech output device 1110, a recorded speech synthesis unit 1120, and a regular speech synthesis unit 1130. Note that the terminal device 100 includes a CPU, a memory, and a recording medium (not illustrated), and the like, and executes a predetermined program stored in the memory or the recording medium in the CPU, thereby realizing respective functions of the speech section detection unit 1010, the speech encoding unit 1020, the communication control unit 1030, the speech recognition unit 1040, the intention estimation unit 1060, the selection unit 1070, the HMI control unit 1100, the speech output device 1110, the recorded speech synthesis unit 1120, and the regular speech synthesis unit 1130. Further, the terminal device 100 can realize respective functions of the dictionary database 1050 and the user satisfaction level storage unit 1080, using a predetermined storage area in the recording medium.

The speech section detection unit 1010 detects a speech input by a user through a microphone 10. The speech section detection unit 1010 extracts a portion actually uttered by the user from a speech signal input from the microphone 10, samples a signal waveform of the portion, and converts the signal waveform into speech data, thereby detecting the speech of the user.

The speech encoding unit 1020 converts the speech of the user detected by the speech section detection unit 1010 into a data format for transmission to the server 200. The speech encoding unit 1020 performs predetermined compression processing for the speech data output from the speech section detection unit 1010 to reduce a data amount to generate the speech information suitable for transmission to the server 200.

The communication control unit 1030 transmits the speech information based on the speech of the user detected in the speech section detection unit 1010, that is, the speech encoding unit 1020 generated by the speech encoding unit 1020 to the server 200. Further, when speech recognition processing is executed as described below in the server 200 that has received the speech information and speech recognition information is transmitted from the server 200, the communication control unit 1030 receives the speech recognition information and transmits the speech recognition information to the selection unit 1070. The communication control unit 1030 is connectable with the communication network 300 configured using a public communication line such as a mobile phone network or the Internet, and performs communication with the server 200 via the communication network 300.

The speech recognition unit 1040 is a speech recognition engine provided in the terminal device 100 and executes speech recognition processing for recognizing the speech of the user detected by the speech section detection unit 1010. In the speech recognition processing executed by the speech recognition unit 1040, the dictionary database 1050 is used. A plurality of dictionary data is registered in advance in the dictionary database 1050. The speech recognition unit 1040 specifies a text corresponding to the speech of the user using one of the plurality of dictionary data. Specifically, for example, the speech recognition unit 1040 selects dictionary data corresponding to a type of the speech likely to be uttered by the user from among the plurality of dictionary data registered in the dictionary database 1050 according to contents (for example, navigation information, music playback, or the like) of content provided to the user using the terminal device 100 or a state of the vehicle in which the terminal device 100 is mounted. Then, the speech recognition unit 1040 searches the selected dictionary data for a text corresponding to the speech data input from the speech section detection unit 1010 to specify the text corresponding to the speech of the user. A speech recognition result by the speech recognition unit 1040, that is, the text corresponding to the speech of user specified by the speech recognition unit 1040 is output to the intention estimation unit 1060 and the selection unit 1070.

The intention estimation unit 1060 estimates an intention of the user to the speech input through the microphone 10 on the basis of the speech recognition result obtained by the speech recognition unit 1040. The intention estimation unit 1060 estimates that the intention of the user is "facility search", for example, if the text obtained as the speech recognition result suggests a search for a facility. Similarly, the intention estimation unit 1060 can estimate the intention of the user such as "telephone call" or "audio playback". Intention estimation information indicating an estimation result of the intention of the user by the intention estimation unit 1060 is input to the selection unit 1070 as speech recognition information based on the speech recognition result in the terminal device 100 together with the speech recognition result (text) by the speech recognition unit 1040. Hereinafter, the speech recognition information based on the speech recognition result in the terminal device 100 is referred to as "terminal speech recognition information". Further, the speech recognition information based on the speech recognition result in the server 200 received by the communication control unit 1030 is referred to as "server speech recognition information". Note that the intention estimation unit 1060 is not indispensable in the terminal device 100 and may be omitted. In this case, intention estimation of the user is not performed in the terminal device 100.

The selection unit 1070 selects either the terminal speech recognition information input from the speech recognition unit 1040 and the intention estimation unit 1060 or the server speech recognition information input from the communication control unit 1030. At this time, the selection unit 1070 calculates a satisfaction level of the user with respect to each of the terminal speech recognition information and the server speech recognition information on the basis of data regarding a satisfaction level of the user stored in the user satisfaction level storage unit 1080, and selects either speech recognition information on the basis of the calculation result. Then, the selection unit 1070 outputs the text of the selected speech recognition information to the HMI control unit 1100 and controls the operation of the HMI control unit 1100 using the selected speech recognition information. Note that a specific method of selecting the speech recognition information by the selection unit 1070 will be described in detail below.

The HMI control unit 1100 controls a human machine interface (HMI) for performing information provision to the user using the text output from the selection unit 1070 on the basis of the control of the selection unit 1070. Specifically, the HMI control unit 1100 controls the HMI by outputting an output command of a speech according to the text to the speech output device 1110 or outputting a display command of an image and letters according to the text to a display 30 connected to the terminal device 100, thereby performing information provision to the user.

The speech output device 1110 outputs a speech signal to a speaker 20 in response to the speech output command from the HMI control unit 1100. The speech output device 1110 can generate an arbitrary speech signal using a recorded speech stored in advance in the recorded speech synthesis unit 1120 or a synthesized speech generated by the regular speech synthesis unit 1130. When the speech output command is output from the HMI control unit 1100, the speech signal according to the speech output command is generated in the speech output device 1110 and is output to the speaker 20.

A touch panel 40 is an operation member integrally configured with the display 30, and detects operation information of when the user touches the screen of the display 30 by hand and outputs the operation information to the HMI control unit 1100. The HMI control unit 1100 controls a screen displayed on the display 30 on the basis of the operation information from the touch panel 40.

The server 200 is installed in a place separated from the terminal device 100, and includes a communication control unit 1210, a speech dialog control unit 1220, a dialog scenario 1230, a speech decoding unit 1240, a speech recognition unit 1250, a dictionary database 1260, and an intention estimation unit 1270. Note that the server 200 includes a CPU, a memory, and a recording medium (not illustrated), and the like, and executes a predetermined program stored in the memory or the recording medium in the CPU, thereby realizing respective functions of the communication control unit 1210, the speech dialog control unit 1220, the speech decoding unit 1240, the speech recognition unit 1250, and the intention estimation unit 1270. Further, the server 200 can realize respective functions of the dialog scenario 1230 and the dictionary database 1260, using a predetermined storage area in the recording medium.

The communication control unit 1210 receives the speech information transmitted from the terminal device 100. Further, when the speech recognition unit 1250 executes the speech recognition processing on the basis of the received speech information and speech recognition information based on a result is input from the speech recognition unit 1250 via the speech dialog control unit 1220, the communication control unit 1210 transmits the speech recognition information to the terminal device 100 as the server speech recognition information. The communication control unit 1210 is connectable to the communication network 300 and performs communication with the terminal device 100 via the communication network 300.

The speech dialog control unit 1220 controls a screen and a speech guidance presented to the user by the terminal device 100 using the display 30 and the speaker 20, using the dialog scenario 1230. In the dialog scenario 1230, information of a screen and a speech to be output to the user in each scene, and a text and an intention corresponding to a speech likely to be uttered by the user with respect to the information are recorded in combination, for example. Furthermore, information of a screen and a speech to be output next is also recorded as information of a transition destination according to the speech of the user. The speech dialog control unit 1220 can control the operation of the terminal device 100 via the communication control unit 1210 on the basis of the aforementioned information.

The speech decoding unit 1240 restores the speech of the user on the basis of the speech information transmitted from the terminal device 100. The speech decoding unit 1240 decompresses the speech data compressed in the speech encoding unit 1020 of the terminal device 100, for example, thereby restoring the speech of the user input to the terminal device 100 via the microphone 10.

The speech recognition unit 1250 is a speech recognition engine provided in the server 200 and executes speech recognition processing for recognizing the speech of the user based on the speech information received from the terminal device 100. In the speech recognition processing executed by the speech recognition unit 1250, the dictionary database 1260 is used. The speech recognition unit 1250 searches the dictionary database 1260 for a text corresponding to the speech data input from the speech decoding unit 1240 to specify the text corresponding to the speech of the user. Note that a plurality of dictionary data is registered in advance in the dictionary database 1260, and the text corresponding to the speech of the user may be specified by the speech recognition unit 1250, similarly to the dictionary database 1050 of the terminal device 100. A speech recognition result by the speech recognition unit 1250, that is, the text corresponding to the speech of user specified by the speech recognition unit 1250 is output to the intention estimation unit 1270 and is output to the communication control unit 1210 via the speech dialog control unit 1220.

The intention estimation unit 1270 estimates an intention of the user to the speech input to the terminal device 100 on the basis of the speech recognition result obtained by the speech recognition unit 1250. The intention estimation unit 1270 can estimate the intention of the user by a technique similar to the method by the intention estimation unit 1060 in the terminal device 100. The intention estimation information indicating an estimation result of the intention of the user by the intention estimation unit 1270 is output together with the speech recognition result (text) by the speech recognition unit 1250 to the communication control unit 1210 via the speech dialog control unit 1220 as the server speech recognition information. The communication control unit 1210 transmits the server speech recognition information thus input to the terminal device 100. Note that the intention estimation unit 1270 is not indispensable in the server 200 and may be omitted. In this case, the intention of the user is not estimated in the server 200.

Next, information provision to the user by the terminal device 100 will be described. The terminal device 100 in the speech recognition system 1 calculates a satisfaction level of the user with respect to each of the terminal speech recognition information and the server speech recognition information in the selection unit 1070, as described above, and selects either speech recognition information on the basis of the calculation result. Then, the terminal device 100 controls the operation of the HMI control unit 1100 such that a user satisfaction level of when using the selected speech recognition information becomes maximum and performs the information provision to the user. For example, the terminal device 100 controls the HMI control unit 1100 to perform any of three types of operations: an adoption operation, a confirmation operation, and a rejection operation, to change the method of the information provision to the user to maximize the user satisfaction level.

FIG. 2 is a diagram illustrating examples of screens respectively displayed on the display 30 in the adoption operation, the confirmation operation, and the rejection operation. At this time, it is assumed that the user utters a speech "Yokohama International Airport", for example. Further, it is assumed that the intention of the user to this speech is an input operation of "setting Yokohama International Airport to the destination". Note that the speech recognition system 1 recognizes the above speech uttered by the user and operates to perform the information provision as intended by the user from the recognition result. However, there are cases where an error occurs in speech recognition in the speech recognition unit 1040 of the terminal device 100 or the speech recognition unit 1250 of the server 200 due to a large noise contained in the speech of the user or the like. Therefore, in the speech recognition system 1, the terminal device 100 performs any of the three types of operations to determine contents of the input operation of the user after confirmation of the user or reject without adopting the obtained speech recognition result once according to the situation.

A screen 2010 in FIG. 2(*a*) is an example of a screen displayed on the display 30 in a case where the adoption operation is performed for the above speech. In this case, the selection unit 1070 determines that the input operation of "setting Yokohama International Airport to the destination" specified on the basis of the speech recognition result of the terminal device 100 or the server 200 by the speech recognition system 1 has high reliability of being intended by the user. Therefore, the selection unit 1070 immediately adopts the input operation of the user and reflects the input operation on processing of navigation information provided by the terminal device 100 to the user.

A screen 2020 in FIG. 2(*b*) and a screen 2030 in FIG. 2(*c*) are examples of screens displayed on the display 30 in a case where the confirmation operation is performed for the above speech. In this case, the selection unit 1070 prompts the user to confirm whether the input operation specified on the basis of the speech recognition result of the terminal device 100 or the server 200 by the speech recognition system 1 is as intended by the user. On the screen 2020 in FIG. 2(*b*), only one input operation candidate recognized by the speech recognition system 1 is displayed. The user confirms whether this candidate is as intended with two choices of "Yes" and "No". Meanwhile, on the screen 2030 in FIG. 2(*c*), a plurality of input operation candidates recognized by the speech recognition system 1 is displayed. The user selects any of the candidates to confirm the input operation meeting the intention. After the confirmation by the user, the selection unit 1070 adopts the confirmed input operation as the input operation by the user.

A screen 2040 in FIG. 2(*d*) is an example of a screen displayed on the display 30 in a case where the rejection operation is performed for the above speech. In this case, the selection unit 1070 determines that the candidates of the input operation specified on the basis of the speech recognition result of the terminal device 100 or the server 200 by the speech recognition system 1 are not correct and rejects without adopting any of the candidates. Then, the selection unit 1070 performs the speech recognition in the speech recognition system 1 again by urging the user to speak again to obtain a correct candidate of the input operation.

Figure 3:
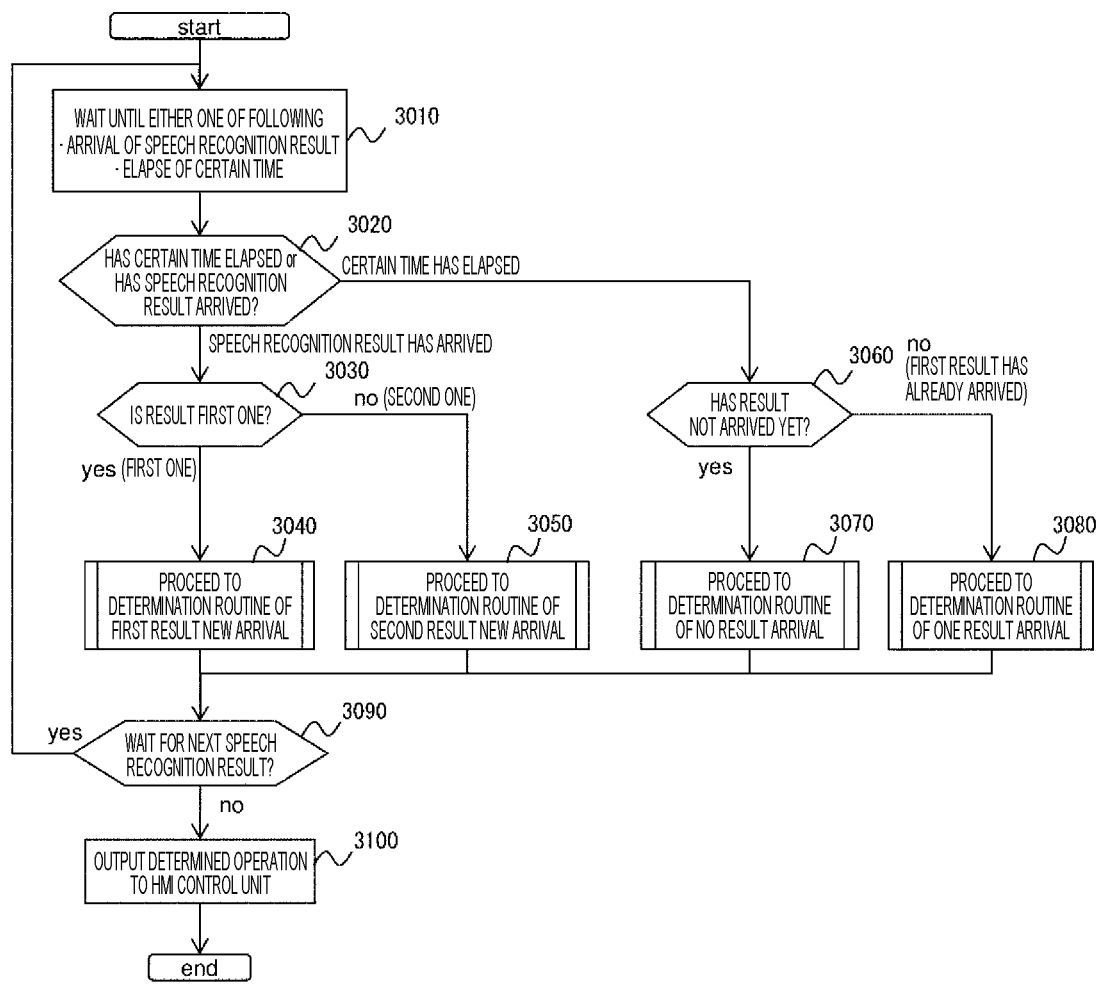
FIG. 3 is a flowchart of processing executed in a selection unit.

Next, a method of selecting speech recognition information in the selection unit 1070 of the terminal device 100 will be described. FIG. 3 is a flowchart of processing executed by the selection unit 1070. The processing illustrated in the flowchart in FIG. 3 is started when the speech uttered by the user is input through the microphone 10 to the terminal device 100. Note that the start of utterance by the user may be determined by the user pressing an operation button (not illustrated) provided in the terminal device 100 or the utterance of the user may be detected without pressing the operation button.

In step 3010, the selection unit 1070 waits until arrival of the speech recognition result from the speech recognition unit 1040 of the terminal device 100, that is, the terminal speech recognition information, or the speech recognition result from the speech recognition unit 1250 of the server 200, that is, the server speech recognition information, or waits until elapse of a certain time from the start of the processing or from arrival of a previous speech recognition result. The reason why waiting until the elapse of a certain time here is to periodically predict the user satisfaction level at the point of time when the speech recognition result cannot be obtained and to determine the next operation according to a predicted value. When the speech recognition result arrives or the certain time has elapsed, the standby is canceled and the processing proceeds to next step 3020.

In step 3020, the selection unit 1070 determines which of the arrival of the speech recognition result and the elapse of the certain time is the cause of canceling the standby in step 3010. As a result, the processing proceeds to step 3030 in the case where the standby has been canceled by the arrival of the speech recognition result, or the processing proceeds to step 3060 in the case where the standby has been canceled by the elapse of the certain time.

In step 3030, the selection unit 1070 determines whether the arrived speech recognition result is the first one. The processing proceeds to step 3040 in the case where the arrived speech recognition result is the first one, that is, the speech recognition result is the speech recognition result that has arrived first, and the processing proceeds to step 3050 in the case where the speech recognition result is the second one, that is, the speech recognition result is the speech recognition result that has arrived second. Note that, in the processing of step 3030, it is irrelevant whether the output source of the arrived speech recognition result is the terminal device 100 (speech recognition unit 1040) or the server 200 (speech recognition unit 1250). Normally, however, due to delays in communication or the like, the speech recognition result from the terminal device 100 arrives earlier and the speech recognition result from the server 200 arrives later.

In step 3040, the selection unit 1070 proceeds to a determination routine of first result new arrival. Here, processing for determining whether using the first arrived speech recognition result or waiting for the next speech recognition result is executed according to the flowchart in FIG. 4. Note that details of the flowchart of FIG. 4 will be described below.

In step 3050, the selection unit 1070 proceeds to a determination routine of second result new arrival. Here, processing for determining whether using either the first arrived speech recognition result or the second arrived speech recognition result is executed according to the flowchart in FIG. 5. Note that details of the flowchart of FIG. 5 will be described below.

In step 3060, the selection unit 1070 determines whether the speech recognition result has not arrived yet. The processing proceeds to step 3070 in the case where the speech recognition result has not arrived yet, that is, no speech recognition result has been received from both the terminal device 100 (speech recognition unit 1040) and the server 200 (speech recognition unit 1250), and the processing proceeds to step 3080 in the case where the first speech recognition result has been already arrived, that is, the speech recognition result has been received from either the terminal device 100 (speech recognition unit 1040) or the server 200 (speech recognition unit 1250).

In step 3070, the selection unit 1070 proceeds to a determination routine of no result arrival. Here, processing for determining whether to wait until arrival of the speech recognition result is executed according to the flowchart in FIG. 6. Note that details of the flowchart of FIG. 6 will be described below.

In step 3080, the selection unit 1070 proceeds to a determination routine of first result arrival. Here, processing for determining whether using the first arrived speech recognition result or waiting for the next speech recognition result is executed according to the flowchart in FIG. 7. Note that details of the flowchart of FIG. 7 will be described below.

After executing any of steps 3040, 3050, 3070, and 3080, the selection unit 1070 executes step 3090. In step 3090, the selection unit 1070 determines whether to wait for the next speech recognition result. Here, a predetermined flag state is confirmed. As a result, the selection unit 1070 determines to wait for the next speech recognition result in the case where the flag is set, and returns to step 3010 and stands by. On the other hand, the processing proceeds to step 3100 in the case where the flag is not set. The flag used for the determination in step 3090 is set when a predetermined condition is satisfied in step 3040, 3070, or 3080. Details of this condition will be described below with reference to FIGS. 4, 6, and 7.

In step 3100, the selection unit 1070 outputs a command for performing the operation determined in any of steps 3040, 3050, 3070, and 3080 to the HMI control unit 1100. The HMI control unit 1100 controls the HMI and performs the information provision to the user using the display screen as described in FIG. 2 according to the command. That is, the HMI control unit 1100 displays, on the display 30, a screen such as the screen 2010 in FIG. 2(a) in the adoption operation, a screen such as the screen 2020 in FIG. 2(b) or the screen 2030 in FIG. 2(c) in the confirmation operation, or a screen such as the screen 2040 in FIG. 2(d) in the rejection operation. Further, the terminal device 100 executes processing corresponding to these screens.

After executing step 3100, the selection unit 1070 terminates the processing illustrated in the flowchart in FIG. 3 and waits until a next speech input.

Next, details of the processing in steps 3040, 3050, 3070, and 3080 in FIG. 3 will be described in order. First, the determination routine of first result new arrival executed in step 3040 will be described with reference to the flowchart in FIG. 4.

In step 4010, the selection unit 1070 receives the arrived speech recognition result and sets an identification code i1 to the speech recognition result. The identification code i1 is configured in combination of "i" that is a symbol representing the speech recognition result and "1" that is a number representing the first speech recognition result. Hereinafter, the first speech recognition result with the identification code i1 set is referred to as "speech recognition result i1".

In step 4020, the selection unit 1070 determines whether the output source of the speech recognition result i1 is the terminal device 100 or the server 200. The processing proceeds to step 4030 in the case where the output source is the server 200, that is, the speech recognition result i1 is the server speech recognition information, and the processing proceeds to step 4040 in the case where the output source is the terminal device 100, that is, the speech recognition result i1 is the terminal speech recognition information.

In step 4030, the selection unit 1070 sets an output source k1 of the first speech recognition result and an output source k2 of the second speech recognition result. Here, the selection unit 1070 sets "server" indicating the server 200 to the output source k1 of the first speech recognition result that is, the speech recognition result i1, and sets "terminal" indicating the terminal device 100 to the output source k2 of the second speech recognition result that has not been arrived yet.

In step 4040, the selection unit 1070 sets the output source k1 of the first speech recognition result and the output source k2 of the second speech recognition result. Here, the selection unit 1070 sets "terminal" indicating the terminal device 100 to the output source k1 of the first speech recognition result, that is, the speech recognition result i1, and sets "server" indicating the server 200 to the output source k2 of the second speech recognition result that has not been arrived yet, contrary to step 4030.

After setting the identification codes k1 and k2 in step 4030 or 4040, in step 4050, the selection unit 1070 estimates a domain d1 corresponding to the speech recognition result i1. The domain is information indicating an attribute of the speech input by the user. The terminal device 100 classifies the speech into a plurality of attributes according to difficulty of a task executed by a corresponding input operation, a type of information provided to the user, and the like, and sets a plurality of domains in advance corresponding to the plurality of attributes. For example, three types of domains of "address search", "facility name search", and "navigation command" are set for the speech input when providing navigation information. The selection unit 1070 estimates which domain of the domains set in the terminal device 100 corresponds to the speech recognition result i1 and sets the domain d1 on the basis of an estimation result. At this time, the domain d1 may be estimated according to which dictionary of a plurality of dictionaries registered in advance in the dictionary database 1050 or 1230 has been used by the speech recognition unit 1040 or 1250 to recognize the speech. Further, the domain d1 may be estimated on the basis of the intention estimation information in the case where the terminal speech recognition information or the server speech recognition information acquired as the speech recognition result i1 includes the intention estimation information indicating the estimation result of the intention of the user by the intention estimation unit 1060 or 1270. Note that, in the case where the domain corresponding to the speech recognition result i1 cannot be estimated, the domain d1 is set to "unknown".

In step 4060, the selection unit 1070 estimates reliability c1 of the speech recognition result i1. The reliability is an index indicating a likelihood of the speech recognition result, and various indices can be used.

In step 4070, the selection unit 1070 measures an elapsed time from when the user finishes the utterance and the speech is input to the terminal device 100 to the present, that is, to when the speech recognition result i1 is obtained in the terminal device 100, as an elapsed time t1. Note that another time index may be measured as the elapsed time t1 as long as the time index is related to an elapsed time from the input of the speech to the terminal device 100 to the obtainment of the speech recognition result i1. For example, the measurement of the elapsed time t1 may be started from the point of time when the user starts the utterance or a time from when the speech recognition result i1 is received to when the screen is displayed on the display 30 is predicted and this time may be added to the elapsed time t1.

In step 4080, the selection unit 1070 calculates an estimated accuracy rate p1 of the speech recognition result i1. Here, the selection unit 1070 calculates the estimated accuracy rate p1 using a preset function Fp on the basis of the output source k1 set in step 4030 or 4040, the domain d1 estimated in step 4050, the reliability c1 estimated in step 4060, and the elapsed time t1 measured in step 4070. The estimated accuracy rate p1 is a value indicating how much probability the speech recognition result i1 matches the speech of the user. That is, the probability that the speech recognition result i1 matches the speech of the user may change depending not only on the reliability c1 but also on the domain d1 and the output source k1. Further, variation in the probability that the speech recognition result i1 matches the speech of the user according to the time required for the speech recognition processing in the speech recognition unit 1040 of the terminal device 100 or the speech recognition unit 1250 of the server 200 is also empirically known in some cases. Therefore, by use of such empirical knowledge, correlation between variables k1, d1, c1, and t1 and the estimated accuracy rate p1 is checked in advance, and the function Fp is set on the basis of a result. Then, values of the variables k1, d1, c1, and t1 set in the processing in steps 4030 to 4070 are input to the function Fp, whereby the estimated accuracy rate p1 can be calculated. Note that, in step 4080, all the variables k1, d1, c1, and t1 are not necessarily used. The estimated accuracy rate p1 can be calculated using any one or more of arbitrary variables.

In step 4090, the selection unit 1070 calculates a user satisfaction level with information provision of the case of using the speech recognition result i1. Here, the user satisfaction levels with the speech recognition result i1 are respectively calculated for the aforementioned three types of operations when the HMI control unit 1100 performs the information provision to the user, that is, the adoption operation, the confirmation operation, and the rejection operation. Hereinafter, the user satisfaction level in the adoption operation is represented by Sa1, the user satisfaction level in the confirmation operation is represented by Sc1, and the user satisfaction level in the rejection operation is represented by Sr1, respectively.

The above-described user satisfaction levels Sa1, Sc1, and Sr1 can be calculated on the basis of the domain d1 estimated in step 4050, the elapsed time t1 measured in step 4070, and the estimated accuracy rate p1 calculated in step 4080. For example, the user satisfaction levels Sa1, Sc1, and Sr1 can be calculated by substituting the variables d1, t1, and p1 to functions Fsa, Fsc, and Fsr set in advance for the respective types of operations. These functions Fsa, Fsc, and Fsr are set in advance using the empirical knowledge and the like and are stored in the user satisfaction level storage unit 1080 as data regarding the user satisfaction level. Note that, in step 4090, all the variables d1, t1, and p1 are not necessarily used. The user satisfaction levels Sa1, Sc1, and Sr1 can be calculated using any one or more of arbitrary variables.

Figure 8A:
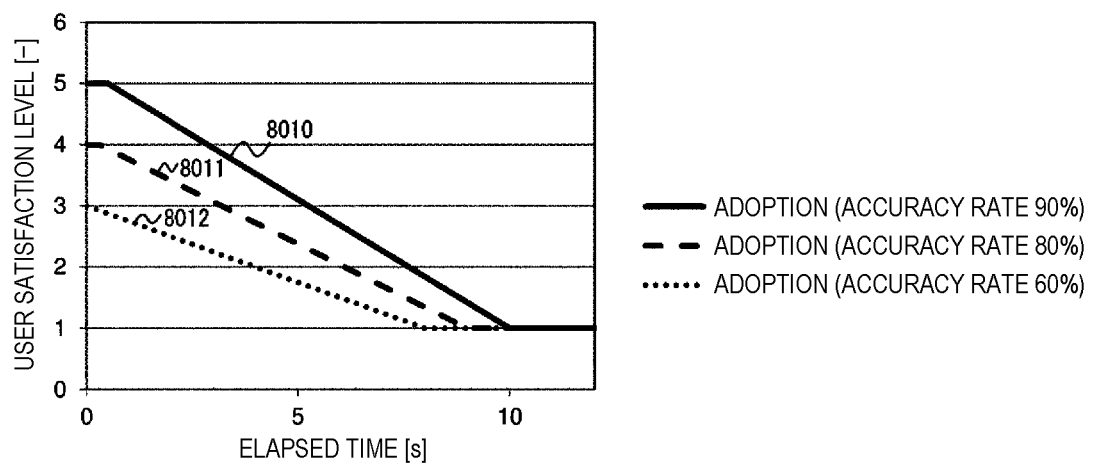
FIGS. 8A and 8B are diagrams illustrating examples of functions for calculating user satisfaction levels.

FIG. 8 is a diagram illustrating examples of the functions Fsa, Fsc, and Fsr for calculating the user satisfaction levels Sa1, Sc1, and Sr1. The graphs 8010, 8011, and 8012 illustrated in FIG. 8(a) are examples of the function Fsa for calculating the user satisfaction level Sa1 in the adoption operation. The graph 8010 illustrates a relationship between the elapsed time t1 and the user satisfaction level Sa1 of when the estimated accuracy rate p1 is 90% as an example of the function Fsa. The graph 8011 illustrates a relationship between the elapsed time t1 and the user satisfaction level Sa1 of when the estimated accuracy rate p1 is 80% as an example of the function Fsa. The graph 8012 illustrates a relationship between the elapsed time t1 and the user satisfaction level Sa1 of when the estimated accuracy rate p1 is 60% as an example of the function Fsa. In these graphs, the minimum value of the user satisfaction level Sa1 is 1 and the maximum value of the user satisfaction level Sa1 is 5.

Figure 8B:
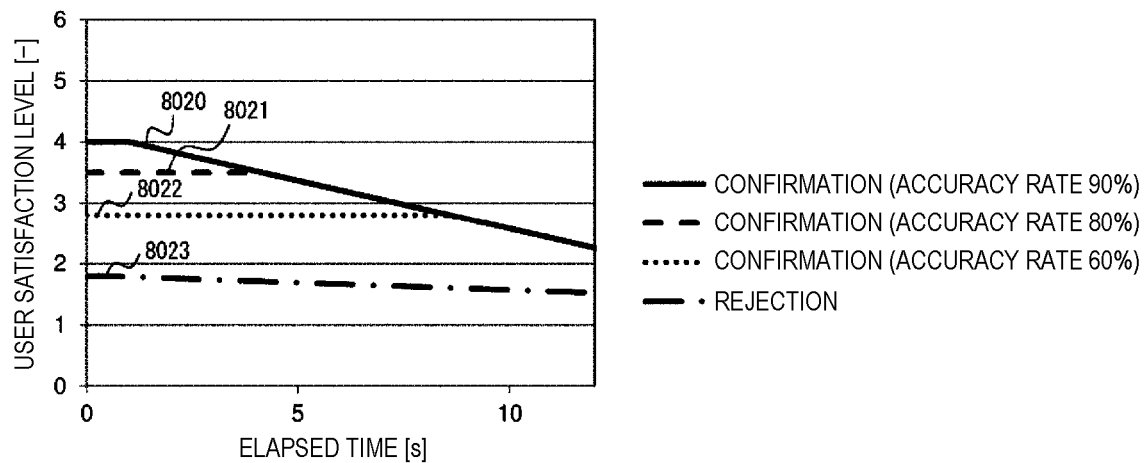

The graphs 8020, 8021, and 8022 illustrated in FIG. 8(b) are examples of the function Fsc for calculating the user satisfaction level Sc1 in the confirmation operation. The graph 8020 illustrates a relationship between the elapsed time t1 and the user satisfaction level Sc1 of when the estimated accuracy rate p1 is 90% as an example of the function Fsc. The graph 8021 illustrates a relationship between the elapsed time t1 and the user satisfaction level Sc1 of when the estimated accuracy rate p1 is 80% as an example of the function Fsc. The graph 8022 illustrates a relationship between the elapsed time t1 and the user satisfaction level Sc1 of when the estimated accuracy rate p1 is 60% as an example of the function Fsc. Further, the graph 8023 illustrated in FIG. 8(b) is an example of the function Fsr for calculating the user satisfaction level Sr1 in the rejection operation and illustrates a relationship between the elapsed time t1 and the user satisfaction level Sr1. In these graphs, the minimum value of the user satisfaction levels Sc1 and Sr1 is 1 and the maximum value of the user satisfaction levels Sc1 and Sr1 is 5.

Note that the graphs in FIGS. 8(a) and 8(b) illustrate examples of a case where the domain d1 is, for example, "navigation command".

As a general characteristic of the user satisfaction level, it is known that the user satisfaction level decreases as the time from when the user speaks to when the terminal device 100 performs some operation becomes longer. Therefore, in the graphs in FIGS. 8(a) and 8(b), the user satisfaction levels Sa1, Sc1, and Sr1 gradually decrease as the elapsed time t1 increases.

Here, in the graphs in FIGS. 8(a) and 8(b), it is known that the user satisfaction level Sa1 in the adoption operation is the highest, the user satisfaction level Sc1 in the confirmation operation is the next highest, and the user satisfaction level Sr1 in the rejection operation is the lowest when the value of the elapsed time t1 is relatively small. Further, it is known that the user satisfaction level Sa1 in the adoption operation substantially decreases, whereas the user satisfaction level Sc1 in the confirmation operation and the user satisfaction level Sr1 in the rejection operation less substantially decrease, as the value of the elapsed time t1 becomes larger. Further, it is known that the decrease in the user satisfaction level Sa1 in the adoption operation according to the increase in the elapsed time t1 is more noticeable as the value of the estimated accuracy rate p1 is larger. The difference in the tendency of change in the user satisfaction level due to the difference in the method of information provision to the user will be described below.

In general, the user satisfaction level becomes high when the adoption operation is performed at the earliest possible timing to adopt the correct speech recognition result if the value of the estimated accuracy rate p1 is sufficiently high. In the meantime, when the adoption operation is performed in the case where the value of the estimated accuracy rate p1 is low, an incorrect speech recognition result is adopted and a risk that an input operation different from the intention of the user is performed in the terminal device 100 becomes high. Therefore, in the case where the value of the estimated accuracy rate p1 is low, the confirmation operation is performed and one or a plurality of options indicated by the speech recognition result is presented to the user, so that there is a higher possibility that the input operation as intended by the user can be executed and therefore the user satisfaction level becomes higher on an average than the case where the adoption operation is performed. Further, in the case where the elapsed time t1 becomes long and the estimated accuracy rate p1 is low, the user satisfaction level becomes extremely low if an incorrect speech recognition result is adopted by performing the adoption operation. Therefore, even in this case, it is predicted that a higher user satisfaction level can be obtained by performing the confirmation operation than the adoption operation.

Further, in the case of performing the rejection operation, the user satisfaction level generally becomes low. However, in the case where the elapsed time t1 is long, the rejection operation is performed to urge the user to speak again, so that the speech recognition having been not able to be performed well can be simply conveyed to the user. Further, in this case, it is expected that the user more clearly speaks than the previous time. Therefore, there is a high possibility of obtaining the correct speech recognition result. As described above, in the case where the elapsed time t1 is long, the user satisfaction level may become higher by performing the rejection operation than the adoption operation or the confirmation operation.

Figure 9A:
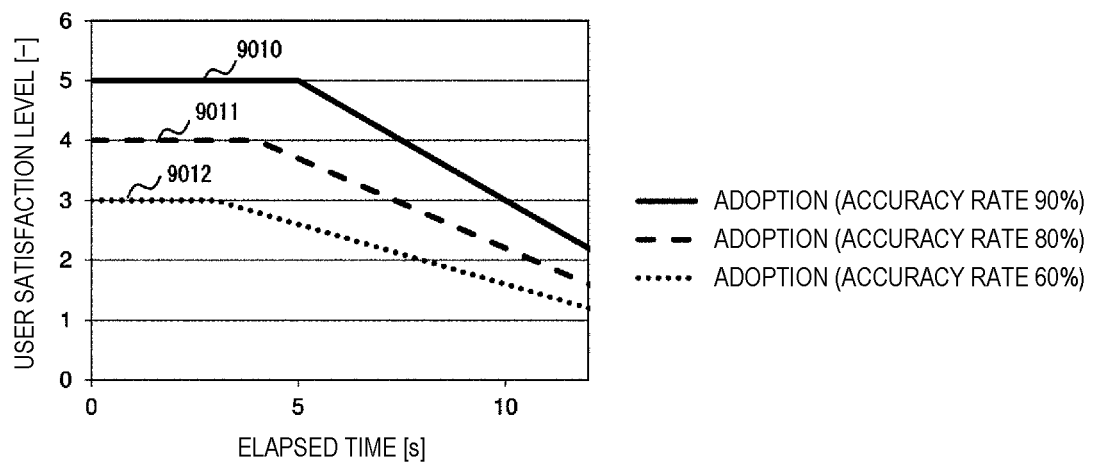
FIGS. 9A and 9B are diagrams illustrating other examples of the functions for calculating user satisfaction levels.

FIG. 9 is a diagram illustrating examples of the functions Fsa, Fsc, and Fsr for calculating the user satisfaction levels Sa1, Sc1, and Sr1 in a case where the domain d1 is different from that of FIG. 8. The graphs 9010, 9011, and 9012 illustrated in FIG. 9(a) are examples of the function Fsa for calculating the user satisfaction level Sa1 in the adoption operation. The graph 9010 illustrates a relationship between the elapsed time t1 and the user satisfaction level Sa1 of when the estimated accuracy rate p1 is 90% as an example of the function Fsa. The graph 9011 illustrates a relationship between the elapsed time t1 and the user satisfaction level Sa1 of when the estimated accuracy rate p1 is 80% as an example of the function Fsa. The graph 9012 illustrates a relationship between the elapsed time t1 and the user satisfaction level Sa1 of when the estimated accuracy rate p1 is 60% as an example of the function Fsa. In these graphs, the minimum value of the user satisfaction level Sa1 is 1 and the maximum value of the user satisfaction level Sa1 is 5.

Figure 9B:
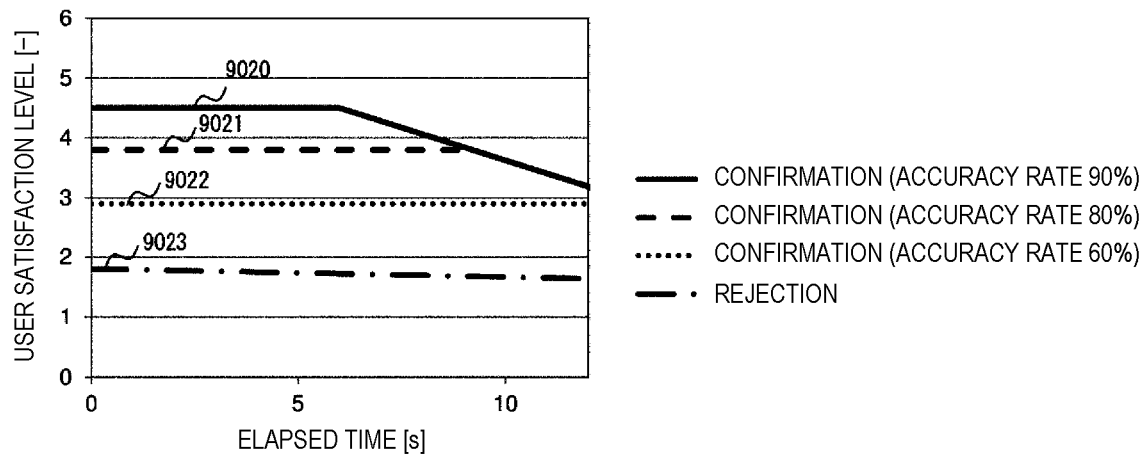

The graphs 9020, 9021, and 9022 illustrated in FIG. 9(b) are examples of the function Fsc for calculating the user satisfaction level Sc1 in the confirmation operation. The graph 9020 illustrates a relationship between the elapsed time t1 and the user satisfaction level Sc1 of when the estimated accuracy rate p1 is 90% as an example of the function Fsc. The graph 9021 illustrates a relationship between the elapsed time t1 and the user satisfaction level Sc1 of when the estimated accuracy rate p1 is 80% as an example of the function Fsc. The graph 9022 illustrates a relationship between the elapsed time t1 and the user satisfaction level Sc1 of when the estimated accuracy rate p1 is 60% as an example of the function Fsc. Further, the graph 9023 illustrated in FIG. 9(b) is an example of the function Fsr for calculating the user satisfaction level Sr1 in the rejection operation and illustrates a relationship between the elapsed time t1 and the user satisfaction level Sr1. In these graphs, the minimum value of the user satisfaction levels Sc1 and Sr1 is 1 and the maximum value of the user satisfaction levels Sc1 and Sr1 is 5.

Note that the graphs in FIGS. 9(a) and 9(b) illustrate examples of a case where the domain d1 is, for example, "address search" or "facility name search". In these graphs, the lowering rates of the user satisfaction levels Sa1 and Sc1 are small even when the elapsed time t1 becomes longer, as compared with the graphs illustrated in FIGS. 8(a) and 8(b) where the domain d1 is the "navigation command". The difference in the tendency of change in the user satisfaction level due to the difference in the domain d1 will be described below.

Generally, in the case where the type of speech uttered by the user is relatively limited as in the case where the domain is "navigation command", the correct speech recognition result can be obtained in a relatively short response time even in a conventional speech recognition apparatus that recognizes a speech only with a terminal device of a vehicle without having a connection function with a server. Therefore, for users who have used such a conventional speech recognition apparatus, the sense of resistance to the elongation of the elapsed time t1 is strong and the elapsed time t1 at which the user satisfaction level begins to decrease becomes short. In the meantime, in the case where the type of speech uttered by the user is diverse as in the case where the domain is "facility name search" or "address search", the response time is long and speech recognition has not been able to be performed unless the facility name or address name was correctly uttered in the conventional speech recognition apparatus. Therefore, in such a conventional situation where the speech recognition is difficult, the degree of decrease in the user satisfaction level becomes relatively small even if the elapsed time t1 becomes long.

The functions Fsa, Fsc, and Fsr of the user satisfaction levels illustrated in the graphs in FIGS. 8 and 9 are set in advance in the terminal device 100 in consideration of the above-described difference in the tendency of change in the user satisfaction level due to the difference in the domain d1. Furthermore, the above-described difference in the tendency of change in the user satisfaction level due to the difference in the method of information provision to the user is also taken into consideration. To the designing of the functions Fsa, Fsc, and Fsr, a method of determining the functions on the basis of a result of actually carrying out an experiment on a subject, a method of determining the functions on the basis of a predetermined sensory evaluation, a method of determining the functions according to a predetermined design policy, or the like can be applied.

Note that, in the above description, the user satisfaction levels Sa1, Sc1, and Sr1 have been obtained using the same functions Fsa, Fsc, and Fsr regardless of the type of the speech recognition engine, that is, regardless of either speech recognition result of the speech recognition unit 1040 of the terminal device 100 or the speech recognition unit 1250 of the server 200. However, since the estimated accuracy rate p1 substantially changes depending on the combination of the speech recognition engine and the domain d1, there is a possibility that the user satisfaction level substantially changes accordingly. Therefore, data of different functions Fsa, Fsc, and Fsr may be set in advance in the user satisfaction level storage unit 1080 depending on the types of the speech recognition engine, and the user satisfaction levels Sa1, Sc1, and Sr1 may be obtained using the data of the different functions Fsa, Fsc, and Fsr.

Figure 4:
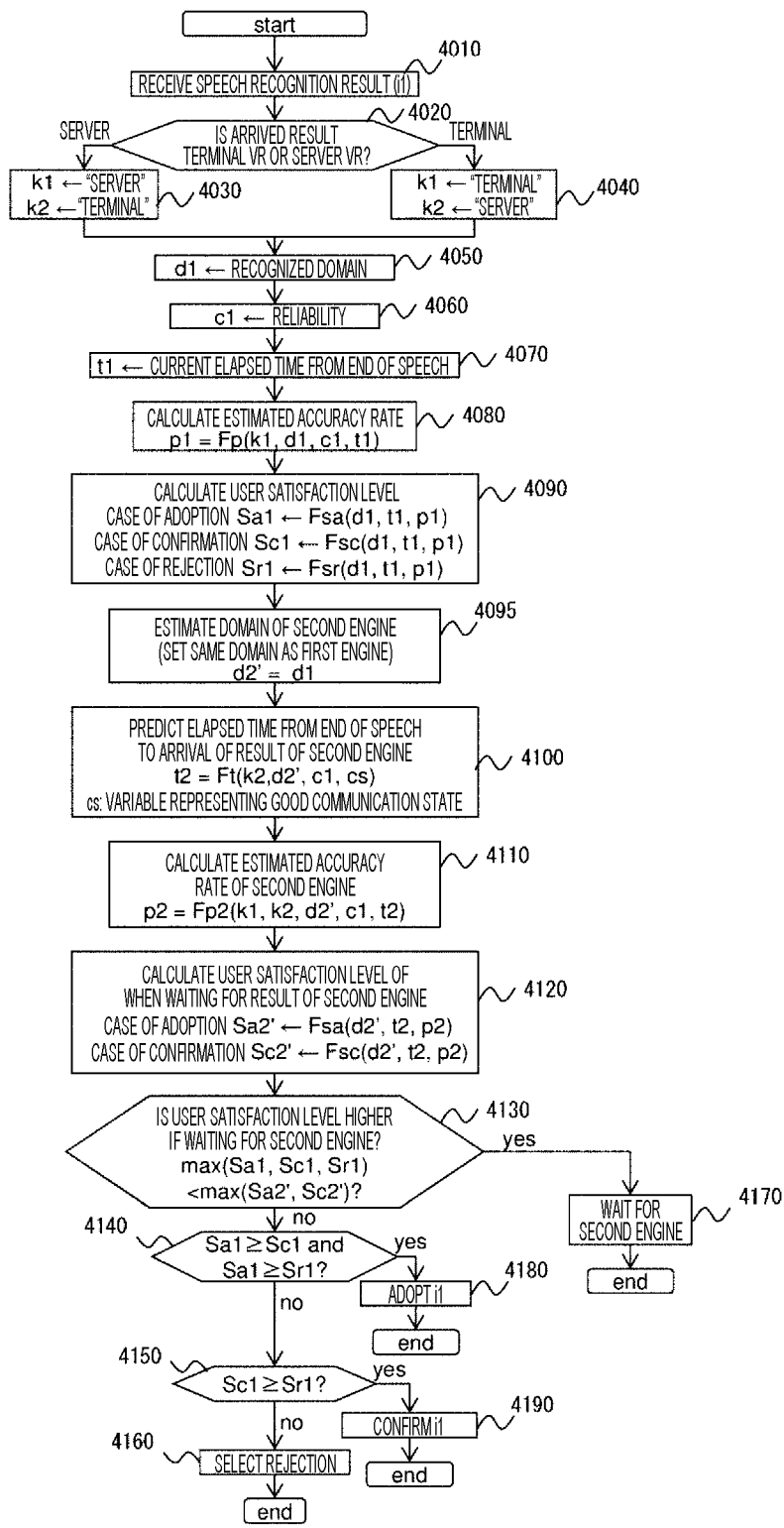
FIG. 4 is a flowchart illustrating a determination routine of first result new arrival.

Returning to the description of FIG. 4, in step 4095, the selection unit 1070 estimates a domain of the second engine, that is, a domain d2' corresponding to the unreceived second speech recognition result. Here, it is usually considered that the possibility that the domain d2' is the same as the domain of the first engine, that is, the domain d1 corresponding to the speech recognition result i1 is high. Therefore, the domain d2' is assumed to be the same as the domain d1, and the same contents as the domain d1 may be set as it is.

In step 4100, the selection unit 1070 measures an elapsed time t2 from when the user finishes the utterance and the speech is input to the terminal device 100 to when the unreceived second speech recognition result is obtained. Here, the selection unit 1070 calculates a predicted value of the elapsed time t2 using a preset function Ft on the basis of the output source k2 set in step 4030 or 4040, the domain d2' estimated in step 4095, the reliability c1 estimated in step 4060, and a communication state indicating a communication state between the terminal device 100 and the server 200. That is, it is considered that the elapsed time t2 changes because the time to arrival of the second speech recognition result changes between the case where the output source k2 is the terminal device 100 and the case where the output source k2 is the server 200. Further, it is considered that the elapsed time t2 changes because the time required for speech recognition is different depending on the domain d2' corresponding to the second speech recognition result. Furthermore, in the case where the output source k2 is the server 200, the communication state cs also has a significant influence on the elapsed time t2. In addition, the reliability c1 of the speech recognition result i1 can also be used to predict the difficulty of speech recognition by another speech recognition engine. Therefore, correlation between variables k2, d2', c1, and cs and the elapsed time t2 is checked in advance, and the function Ft is set on the basis of a result. Then, values of the variables k2, d2', c1, and cs set in the above processing are input to the function Ft, whereby the elapsed time t2 can be estimated. Note that the function Ft may be expressed by a mathematical expression or may be a table value of each variable set on the basis of data collected in advance. Further, another time index may be predicted as the elapsed time t2 as long as the time index is related to an elapsed time from the input of the speech to the terminal device 100 to the obtainment of the second speech recognition result, similarly to the above-described elapsed time t1. Note that, in step 4100, all the variables k2, d2', c1, and cs are not necessarily used. The elapsed time t2 can be estimated using any one or more of arbitrary variables.

In step 4110, the selection unit 1070 calculates an estimated accuracy rate p2 of the second speech recognition result. Here, the estimated accuracy rate p2 is calculated using all information available at the present moment. That is, the selection unit 1070 calculates the estimated accuracy rate p2 using a preset function Fp2 on the basis of the output sources k1 and k2 set in step 4030 or 4040, the domain d2' estimated in step 4095, the reliability c1 estimated in step 4060, and the elapsed time t2 measured in step 4100. Note that the function Fp2 can be preset similarly to the function Fp used to calculate the estimated accuracy rate p1 of the speech recognition result i1 in step 4080. Note that, in step 4110, all the variables k1, k2, d2', c1, and t2 are not necessarily used. The estimated accuracy rate p2 can be calculated using any one or more of arbitrary variables.

In step 4120, the selection unit 1070 calculates a user satisfaction level with information provision of the case of using the second speech recognition result. Here, user satisfaction levels Sa2' and Sc2' with the second speech recognition result are respectively calculated for the adoption operation and the confirmation operation by a method similar to step 4090. That is, the user satisfaction levels Sa2' and Sc2' are respectively calculated by substituting the variables of the domain d2' estimated in step 4095, the elapsed time t2 predicted in step 4100, and the estimated accuracy rate p2 calculated in step 4110 to the above-described functions Fsa and Fsc on the basis of the variables. Note that, in step 4120, all the variables d2', t2, and p2 are not necessarily used. Note that, here, calculation of a user satisfaction level Sr2' in the rejection operation is not necessary. The reason is that there is no realistic case where waiting for the second speech recognition result and rejecting the second speech recognition result is determined to be better.

In the processing in and after step 4130, the selection unit 1070 compares the user satisfaction levels Sa1, Sc1, and Sr1 with the speech recognition result i1 calculated in step 4090 with the user satisfaction levels Sa2' and Sc2' with the second speech recognition result calculated in step 4120. The selection unit 1070 determines whether to select the speech recognition result i1 as the speech recognition result to be used for the information provision to the user by the HMI control unit 1100 or whether to wait until reception of the second speech recognition result without selecting the speech recognition result i1 on the basis of a comparison result. Further, in the case of selecting the speech recognition result i1, which of the adoption operation, the confirmation operation, and the rejection operation is used to perform the information provision to the user is determined.

In step 4130, the selection unit 1070 determines whether the user satisfaction level is higher when waiting for the second speech recognition result than when using the speech recognition result i1. Specifically, the selection unit 1070 compares maximum values of the user satisfaction levels Sa1, Sc1, and Sr1 with the speech recognition result i1 with maximum values of the user satisfaction levels Sa2' and Sc2' with the second speech recognition result. As a result, when the maximum values of the user satisfaction levels Sa2' and Sc2' are larger than the maximum values of the user satisfaction levels Sa1, Sc1, and Sr1, the selection unit 1070 determines that the user satisfaction levels are higher when waiting for the second speech recognition result and advances the processing to step 4170. On the other hand, when the maximum values of the user satisfaction levels Sa1, Sc1, and Sr1 are equal to or larger than the maximum values of the user satisfaction levels Sa2' and Sc2', the selection unit 1070 determines that the user satisfaction levels are higher when using the speech recognition result i1 without waiting for the second speech recognition result and advances the processing to step 4140.

In step 4140, the selection unit 1070 compares the user satisfaction level Sa1 in the adoption operation according to the speech recognition result i1 with the user satisfaction level Sc1 in the confirmation operation and the user satisfaction level Sr1 in the rejection operation. As a result, the processing proceeds to step 4180 when Sa1 is from Sc1 to Sr1, both inclusive, otherwise the processing proceeds to step 4150.

In step 4150, the selection unit 1070 compares the user satisfaction level Sc1 in the confirmation operation according to the speech recognition result i1 with the user satisfaction level Sr1 in the rejection operation. As a result, the processing proceeds to step 4160 when Sc1 is equal to or larger than Sr1, otherwise the processing proceeds to step 4190, that is, when Sc1 is less than Sr1.

In step 4160, the selection unit 1070 selects the rejection operation as the method of the information provision to the user according to the speech recognition result i1. Thereafter, the selection unit 1070 terminates the processing illustrated in the flowchart in FIG. 4 and advances the processing to step 3090 in FIG. 3. In this case, after the negative determination is made in step 3090, in step 3100, a command for performing the rejection operation is output from the selection unit 1070 to the HMI control unit 1100. As a result, a screen such as the screen 2040 in FIG. 2(*d*) is displayed on the display 30, and the user is urged to speak again.

In step 4170, the selection unit 1070 determines to wait for the second speech recognition result and performs the above-described processing of setting a flag. Thereafter, the selection unit 1070 terminates the processing illustrated in the flowchart in FIG. 4 and advances the processing to step 3090 in FIG. 3. In this case, after affirmative determination is made in step 3090, the selection unit 1070 returns to step 3010 and waits until reception of the second speech recognition result or elapse of a certain time.

In step 4180, the selection unit 1070 selects the adoption operation as the method of the information provision to the user according to the speech recognition result i1. Thereafter, the selection unit 1070 terminates the processing illustrated in the flowchart in FIG. 4 and advances the processing to step 3090 in FIG. 3. In this case, the negative determination is made in step 3090, in step 3100, a command of performing the adoption operation is output from the selection unit 1070 to the HMI control unit 1100 on the basis of the speech recognition result i1. As a result, a screen such as the screen 2010 in FIG. 2(a) is displayed on the display 30, and the processing transitions to processing according to the recognized input operation.

Figure 2C:

In step 4190, the selection unit 1070 selects the confirmation operation as the method of the information provision to the user according to the speech recognition result i1. Thereafter, the selection unit 1070 terminates the processing illustrated in the flowchart in FIG. 4 and advances the processing to step 3090 in FIG. 3. In this case, after the negative determination is made in step 3090, in step 3100, a command for performing the confirmation operation is output from the selection unit 1070 to the HMI control unit 1100 on the basis of the speech recognition result i1. As a result, a screen such as the screen 2020 in FIG. 2(b) or the screen 2030 in FIG. 2(c) is displayed on the display 30, and the processing transitions to processing according to the recognized input operation after waiting for confirmation by the user.

As described above, in the processing in and after step 4130, the user satisfaction levels Sa1, Sc1, and Sr1 with the speech recognition result i1 are compared with the user satisfaction levels Sa2' and Sc2' with the second speech recognition result, and the operation with the highest user satisfaction level is selected on the basis of the comparison result. This point will be further described below with a specific example.

In the specific example described below, as a precondition, it is assumed that the speech recognition result from the terminal device 100 arrives first at the selection unit 1070 (k1="terminal") and the elapsed time t1 at this time is 3 seconds. Further, it is assumed that the speech recognition result i1 is "Nippon Budokan" and the input operation corresponding to this recognition result is the facility name search. Therefore, it is assumed that the estimation result of the domain d1 is "facility name search" and the calculation result of the estimated accuracy rate p1 is 80%.

In steps 4100 and 4110, the elapsed time t2 and the estimated accuracy rate p2 regarding the unreceived second speech recognition result (k2="server") are calculated on the basis of the information for the speech recognition result i1. As a result, it is assumed that the elapsed time t2 is predicted to be 7 seconds and the estimated accuracy rate p2 is 90% as a precondition. Note that the "facility name search" same as the domain d1 is set to the domain d2'.

The user satisfaction levels of the case of performing the information provision to the user in the adoption operation, the confirmation operation, and the rejection operation using the first speech recognition result or the second speech recognition result are obtained as follows. Note that the functions Fsa, Fsc, and Fsr illustrated in FIG. 9 are used for the calculation of the user satisfaction levels below.

From the graphs 9011, 9021, and 9023 in FIG. 9, the user satisfaction levels Sa1, Sc1, and Sr1 of the case of using the first speech recognition result are respectively obtained as follows.

The adoption operation: Sa1=4.0
The confirmation operation: Sc1=3.8
The rejection operation: Sr1=1.8

Further, from the graphs 9010, 9020, and 9023 in FIG. 9, the user satisfaction levels Sa2' and Sc2' of the case of using the second speech recognition result are respectively obtained as follows.

The adoption operation: Sa2'=4.2
The confirmation operation: Sc2'=4.3

When comparing the above user satisfaction levels, the user satisfaction level Sc2' of the case of performing the confirmation operation using the second speech recognition result is the highest. Therefore, in this specific example, the processing waits for the second speech recognition result without using the first speech recognition result.

Note that, in the above specific example, the case in which the data of the functions Fsa, Fsc, and Fsr stored in advance in the user satisfaction level storage unit 1080 match the estimated accuracy rates p1 and p2 has been described. However, the user satisfaction levels can be calculated even in the case where the data do not match the estimated accuracy rates. For example, the user satisfaction levels Sa1 and Sa2' in the adoption operation of the case where the estimated accuracy rates p1 and p2 are 85% are obtained by respectively reading the user satisfaction levels from the graphs 9010 and 9011 in FIG. 9 and calculating average values of the user satisfaction levels. Similarly, the user satisfaction levels Sc1 and Sc2' in the confirmation operation are obtained by respectively reading the user satisfaction levels from the graphs 9020 and 9021 in FIG. 9 and calculating average values of the user satisfaction levels. That is, in the case where the data of the user satisfaction levels matching the estimated accuracy rates p1 and p2 are not stored in the user satisfaction level storage unit 1080, the user satisfaction levels can be obtained by linearly interpolating data of user satisfaction levels before and after the aforementioned data. Further, for example, in the case where the data of the user satisfaction levels do not exist before and after the aforementioned data and the linear interpolation cannot be performed, such as in the case where the estimated accuracy rate is 100%, the user satisfaction levels can be obtained using user satisfaction levels closest to the estimated accuracy rate.

Next, the determination routine of second result new arrival executed in step 3050 will be described with reference to the flowchart in FIG. 5.

In step 5010, the selection unit 1070 receives the secondly arrived speech recognition result, and sets an identification code i2 to the speech recognition result. Hereinafter, the second speech recognition result with the identification code i2 set is referred to as "speech recognition result i2".

In step 5020, the selection unit 1070 estimates a domain d2 corresponding to the speech recognition result i2. The method of estimating the domain d2 is similar to the method of estimating the domain d1 in step 4050 in FIG. 4.

In step 5030, the selection unit 1070 estimates reliability c2 of the speech recognition result i2.

In step 5040, the selection unit 1070 measures an elapsed time t2 from when the user finishes the utterance and the speech is input to the terminal device 100 to the present, that is, to when the speech recognition result i2 is obtained in the terminal device 100. Note that another time index may be measured as the elapsed time t2 as long as the time index is related to an elapsed time from the input of the speech to the terminal device 100 to the obtainment of the speech recognition result i2, similarly to the above-described elapsed time t1.

In step 5050, the selection unit 1070 calculates the estimated accuracy rate p2 of the speech recognition result i2. Here, the selection unit 1070 calculates the estimated accuracy rate p2 using the preset function Fp on the basis of the output source k2 set in step 4030 or 4040, the domain d2 estimated in step 5020, the reliability c2 estimated in step S030, and the elapsed time t2 measured in step 5040, similarly to the estimated accuracy rate p1 calculated in step 4080 in FIG. 4. Note that, in step 5050, all the variables k2, d2, c2, and t2 are not necessarily used. The estimated accuracy rate p2 can be calculated using any one or more of arbitrary variables.

In step 5060, the selection unit 1070 determines whether the current mode is a maximum satisfaction level mode or a maximum accuracy rate mode. As a result, the processing proceeds to step 5160 in the case where the current mode is the maximum satisfaction level mode, and the processing proceeds to step 5070 in the case where the current mode is the maximum accuracy rate mode. Note that the maximum satisfaction level mode is a mode of selecting the speech recognition result and the operation of the HMI control unit 1100 such that the user satisfaction level becomes maximum and performing the information provision to the user, and the maximum accuracy rate mode is a mode of performing the information provision to the user using the speech recognition result in which the estimated accuracy rate p1 or p2 becomes maximum.

In the case where the current mode is the maximum accuracy rate mode, in step 5070, the selection unit 1070 compares the estimated accuracy rate p1 of the speech recognition result i1 with the estimated accuracy rate p2 of the speech recognition result i2. As a result, the processing proceeds to step 5080 in the case where the estimated accuracy rate p1 is higher, and the processing proceeds to step 5090 in the case where the estimated accuracy rate p2 is higher or the estimated accuracy rate p1 and the estimated accuracy rate p2 are the same.

In step 5080, the selection unit 1070 sets the speech recognition result i1, and the estimated accuracy rate p1, the domain d1, and the reliability c1 corresponding to the speech recognition result i1, to the maximum likelihood result. Then, i=i1, p=p1, d=d1, and c=c1 are respectively set in order to be referred as variables in calculating the user satisfaction levels in next step 5100.

In step 5090, the selection unit 1070 sets the speech recognition result i2, and the estimated accuracy rate p2, the domain d2, and the reliability c2 corresponding to the speech recognition result i2, to the maximum likelihood results. Then, i=i2, p=p2, d=d2, and c=c2 are respectively set in order to be referred as variables in calculating the user satisfaction levels in next step 5100.

In step 5100, the selection unit 1070 calculates the user satisfaction levels Sa, Sc, and Sr with the information provision of the case of using the speech recognition result i (i=i1 or i2) set to the maximum likelihood result in step S080 or S090. Here, the user satisfaction levels Sa, Sc, and Sr by the adoption operation, the confirmation operation, and the rejection operation in the case of using the maximum likelihood result can be respectively calculated by substituting the variables d, t, and p set in step 5090 to the functions Fsa, Fsc, and Fsr, similarly to the user satisfaction levels Sa1, Sc1, and Sr1 calculated in step 4090 in FIG. 4. Note that, in step 5100, all the variables d, t, and p are not necessarily used. The user satisfaction levels Sa, Sc, and Sr can be calculated using any one or more of arbitrary variables.

In step 5110, the selection unit 1070 compares the user satisfaction level Sa in the adoption operation according to the speech recognition result i with the user satisfaction level Sc in the confirmation operation and the user satisfaction level Sr in the rejection operation. As a result, the processing proceeds to step 5120 when Sa is from Sc to Sr, both inclusive, otherwise the processing proceeds to step 5130.

In step 5120, the selection unit 1070 selects the adoption operation as the method of the information provision to the user according to the speech recognition result i. Thereafter, the selection unit 1070 terminates the processing illustrated in the flowchart of FIG. 5 and advances the processing to step 3090 in FIG. 3. In this case, the negative determination is made in step 3090, in step 3100, a command of performing the adoption operation is output from the selection unit 1070 to the HMI control unit 1100 on the basis of the speech recognition result i. As a result, a screen such as the screen 2010 in FIG. 2(*a*) is displayed on the display 30, and the processing transitions to processing according to the recognized input operation.

In step 5130, the selection unit 1070 compares the user satisfaction level Sc in the confirmation operation according to the speech recognition result i with the user satisfaction level Sr in the rejection operation. As a result, the processing proceeds to step 5140 when Sc is equal to or larger than Sr, otherwise the processing proceeds to step 5150, that is, when Sc is less than Sr.

In step 5140, the selection unit 1070 selects the confirmation operation as the method of the information provision to the user according to the speech recognition result i. Thereafter, the selection unit 1070 terminates the processing illustrated in the flowchart of FIG. 5 and advances the processing to step 3090 in FIG. 3. In this case, after the negative determination is made in step 3090, in step 3100, a command for performing the confirmation operation is output from the selection unit 1070 to the HMI control unit 1100 on the basis of the speech recognition result i. As a result, a screen such as the screen 2020 in FIG. 2(*b*) or the screen 2030 in FIG. 2(*c*) is displayed on the display 30, and the processing transitions to processing according to the recognized input operation after waiting for confirmation by the user.

In step 5150, the selection unit 1070 selects the rejection operation as the method of the information provision to the user according to the speech recognition result i. Thereafter, the selection unit 1070 terminates the processing illustrated in the flowchart of FIG. 5 and advances the processing to step 3090 in FIG. 3. In this case, after the negative determination is made in step 3090, in step 3100, a command for performing the rejection operation is output from the selection unit 1070 to the HMI control unit 1100. As a result, a screen such as the screen 2040 in FIG. 2(*d*) is displayed on the display 30, and the user is urged to speak again.

As described above, in the processing of steps 5070 to 5150 executed in the maximum accuracy rate mode, the operation with the highest user satisfaction level is selected from among the adoption operation, the confirmation operation, and the rejection operation and is executed for the speech recognition result with the higher estimated accuracy rate between the first received speech recognition result i1 and the second received speech recognition result i2.

In the case where the current mode is the maximum satisfaction level mode, in step 5160, the selection unit 1070 calculates the user satisfaction levels Sa1, Sc1, and Sr1 with the information provision of the case of using the first received speech recognition result i1. Here, the user satisfaction levels Sa1, Sc1, and Sr1 by the adoption operation, the confirmation operation, and the rejection operation in the case of using the speech recognition result i1 can be respectively calculated by substituting the variables of the domain d1 estimated in step 4050, the elapsed time t2 measured in step 5040, and the estimated accuracy rate p1 calculated in step 4080 to the functions Fsa, Fsc, and Fsr, similarly to step 4090 in FIG. 4. Note that, in step 5160, all the variables d1, t2, and p1 are not necessarily used. The user satisfaction levels Sa1, Sc1, and Sr1 can be calculated using any one or more of arbitrary variables.

In step 5170, the selection unit 1070 calculates user satisfaction levels Sa2 and Sc2 with the information provision of the case of using the secondly received speech recognition result i2. Here, the user satisfaction levels Sa2 and Sc2 by the adoption operation, the confirmation operation, and the rejection operation in the case of using the speech recognition result i2 can also be respectively calculated by substituting the variables of the domain d2 estimated in step 5020, the elapsed time t2 measured in step 5040, and the estimated accuracy rate p2 calculated in step 5050 to the functions Fsa, Fsc, and Fsr, similarly to step 5160. Note that, in step 5170, all the variables d2, t2, and p2 are not necessarily used. The user satisfaction levels Sa2 and Sc2 can be calculated using any one or more of arbitrary variables.

In step 5180, the selection unit 1070 determines whether the user satisfaction level Sa1 in the adoption operation according to the speech recognition result i1 is the maximum in all the user satisfaction levels calculated in steps 5160 and 5170. As a result, the processing proceeds to step 5190 in a case where Sa1 is the maximum, otherwise processing proceeds to step 5200.

In step 5190, the selection unit 1070 selects the adoption operation as the method of the information provision to the user according to the speech recognition result i1. Thereafter, the selection unit 1070 terminates the processing illustrated in the flowchart of FIG. 5 and advances the processing to step 3090 in FIG. 3. In this case, the negative determination is made in step 3090, in step 3100, a command of performing the adoption operation is output from the selection unit 1070 to the HMI control unit 1100 on the basis of the speech recognition result i1. As a result, a screen such as the screen 2010 in FIG. 2(*a*) is displayed on the display 30, and the processing transitions to processing according to the recognized input operation.

In step 5200, the selection unit 1070 determines whether the user satisfaction level Sa2 in the adoption operation according to the speech recognition result i2 is the maximum in all the user satisfaction levels calculated in steps 5160 and 5170. As a result, the processing proceeds to step 5210 in a case where Sa2 is the maximum, otherwise processing proceeds to step 5220.

In step 5210, the selection unit 1070 selects the adoption operation as the method of the information provision to the user according to the speech recognition result i2. Thereafter, the selection unit 1070 terminates the processing illustrated in the flowchart of FIG. 5 and advances the processing to step 3090 in FIG. 3. In this case, the negative determination is made in step 3090, in step 3100, a command of performing the adoption operation is output from the selection unit 1070 to the HMI control unit 1100 on the basis of the speech recognition result i2. As a result, a screen such as the screen 2010 in FIG. 2(*a*) is displayed on the display 30, and the processing transitions to processing according to the recognized input operation.

In step 5220, the selection unit 1070 determines whether the user satisfaction level Sc1 in the confirmation operation according to the speech recognition result i1 is the maximum in all the user satisfaction levels calculated in steps 5160 and 5170. As a result, the processing proceeds to step 5230 in a case where Sc1 is the maximum, otherwise processing proceeds to step 5240.

In step 5230, the selection unit 1070 selects the confirmation operation as the method of the information provision to the user according to the speech recognition result i1. Thereafter, the selection unit 1070 terminates the processing illustrated in the flowchart of FIG. 5 and advances the processing to step 3090 in FIG. 3. In this case, after the negative determination is made in step 3090, in step 3100, a command for performing the confirmation operation is output from the selection unit 1070 to the HMI control unit 1100 on the basis of the speech recognition result i1. As a result, a screen such as the screen 2020 in FIG. 2(*b*) or the screen 2030 in FIG. 2(*c*) is displayed on the display 30, and the processing transitions to processing according to the recognized input operation after waiting for confirmation by the user.

In step 5240, the selection unit 1070 determines whether the user satisfaction level Sc2 in the confirmation operation according to the speech recognition result i2 is the maximum in all the user satisfaction levels calculated in steps 5160 and 5170. As a result, the processing proceeds to step 5250 in a case where Sc2 is the maximum, otherwise processing proceeds to step 5260.

In step 5250, the selection unit 1070 selects the confirmation operation as the method of the information provision to the user according to the speech recognition result i2. Thereafter, the selection unit 1070 terminates the processing illustrated in the flowchart of FIG. 5 and advances the processing to step 3090 in FIG. 3. In this case, after the negative determination is made in step 3090, in step 3100, a command for performing the confirmation operation is output from the selection unit 1070 to the HMI control unit 1100 on the basis of the speech recognition result i2. As a result, a screen such as the screen 2020 in FIG. 2(*b*) or the screen 2030 in FIG. 2(*c*) is displayed on the display 30, and the processing transitions to processing according to the recognized input operation after waiting for confirmation by the user.

In step 5260, the selection unit 1070 selects the rejection operation as the method of the information provision to the user according to the speech recognition results i1 and i2. Thereafter, the selection unit 1070 terminates the processing illustrated in the flowchart of FIG. 5 and advances the processing to step 3090 in FIG. 3. In this case, after the negative determination is made in step 3090, in step 3100, a command for performing the rejection operation is output from the selection unit 1070 to the HMI control unit 1100. As a result, a screen such as the screen 2040 in FIG. 2(*d*) is displayed on the display 30, and the user is urged to speak again.

As described above, in the processing of steps 5160 to 5260 executed in the maximum satisfaction level mode, the satisfaction levels of the adoption operation, the confirmation operation, and the rejection operation are respectively calculated for the first received speech recognition result i1 and the secondly received speech recognition result i2, and the combination of the speech recognition result and the operation in which the user satisfaction level becomes the highest is selected and executed.

Figure 6:
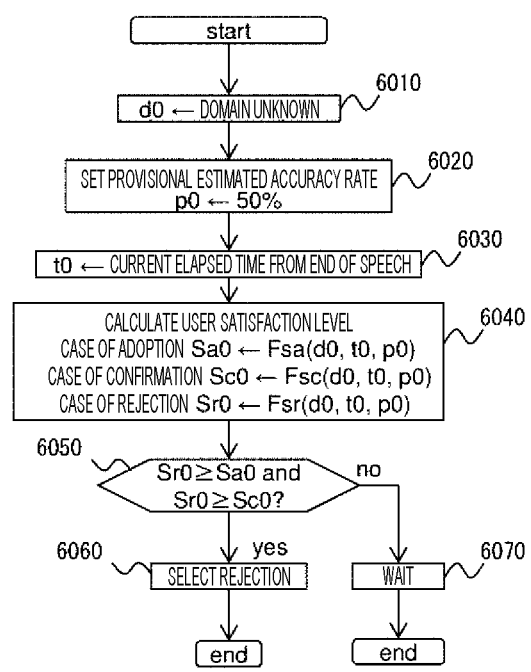
FIG. 6 is a flowchart illustrating a determination routine of no result arrival.

Next, a determination routine of no result arrival executed in step 3070 will be described with reference to the flowchart in FIG. 6.

In step 6010, the selection unit 1070 sets a domain d0 corresponding to the speech recognition result that has not arrived yet to "unknown". That is, since nothing has been obtained as the speech recognition result at this point of time, the domain d0 is set to "unknown" indicating that the domain is unknown.

In step 6020, the selection unit 1070 sets a predetermined estimated accuracy rate, for example, 50%, as a provisional estimated accuracy rate p0 for the speech recognition result that has not arrived yet. That is, since nothing has been obtained as a speech recognition result at this point of time, the provisional estimated accuracy rate p0 is set indicating that the estimated accuracy rate is unknown.

In step 6030, the selection unit 1070 measures an elapsed time t0 from when the user finishes the utterance and the speech is input to the terminal device 100 to the present.

In step 6040, the selection unit 1070 calculates the user satisfaction levels Sa0, Sc0, and Sr0 of a case of performing some operation at the present moment. Here, the user satisfaction levels Sa0, Sc0, and Sr0 by the adoption operation, the confirmation operation, and the rejection operation at the present moment can be respectively calculated by substituting the variables of the domain d0 estimated in step 6010, the elapsed time t0 measured in step 6030, and the estimated accuracy rate p0 set in step 6020 to the functions Fsa, Fsc, and Fsr, similarly to the user satisfaction levels Sa1, Sc1, and Sr1 calculated in step 4090 in FIG. 4. Note that, in step 6040, all the variables d0, t0, and p0 are not necessarily used. The user satisfaction levels Sa0, Sc0, and Sr0 can be calculated using any one or more of arbitrary variables.

In step 6050, the selection unit 1070 compares the user satisfaction level Sr0 in the rejection operation with the user satisfaction level Sa0 in the adoption operation and the user satisfaction level Sc0 in the confirmation operation. As a result, the processing proceeds to step 6060 when Sr0 is from Sa0 to Sc0, both inclusive, otherwise the processing proceeds to step 6070.

Figure 2D:
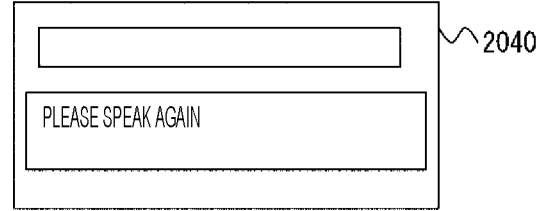

In step 6060, the selection unit 1070 selects the rejection operation. Thereafter, the selection unit 1070 terminates the processing illustrated in the flowchart in FIG. 6 and advances the processing to step 3090 in FIG. 3. In this case, after the negative determination is made in step 3090, in step 3100, a command for performing the rejection operation is output from the selection unit 1070 to the HMI control unit 1100. As a result, a screen such as the screen 2040 in FIG. 2(d) is displayed on the display 30, and the user is urged to speak again.

In step 6070, the selection unit 1070 determines to wait until arrival of the speech recognition result and performs the above-described processing of setting a flag. Thereafter, the selection unit 1070 terminates the processing illustrated in the flowchart in FIG. 6 and advances the processing to step 3090 in FIG. 3. In this case, after affirmative determination is made in step 3090, the selection unit 1070 returns to step 3010 and waits until reception of the speech recognition result or elapse of a certain time again.

In the processing in steps 6010 to 6070 described above, whether to perform the rejection operation to urge the user to speak again despite the speech recognition result having not arrived yet is determined. Therefore, if the determination is easily made to perform the rejection operation in this processing, the user needs to repeatedly speak several times, and the usability of the speech recognition system 1 is greatly impaired. To avoid such a situation, it is desirable to set the domain in which speech recognition is the most difficult, for example, the "unknown", in setting the domain d0 in step 6010. Further, it is desirable to set the minimum estimated accuracy rate necessary for performing the adoption operation or the confirmation operation, that is, 50%, in setting the provisional estimated accuracy rate p0 in step 6020.

Next, a determination routine of one result arrival executed in step 3080 will be described with reference to the flowchart in FIG. 7.

In step 7010, the selection unit 1070 measures an elapsed time t from when the user finishes the utterance and the speech is input to the terminal device 100 to the present as an elapsed time t3. Note that another time index may be measured as the elapsed time t3 as long as the time index is related to an elapsed time from the input of the speech to the terminal device 100 to the present, similarly to the above-described elapsed time t1.

In step 7020, the selection unit 1070 determines whether an elapsed time t3 measured in step 7010 is equal to or less than the elapsed time t2 predicted in step 4100 in FIG. 4. In the case where t3 is equal to or smaller than t2, it is known that the user satisfaction level is higher when waiting for the second speech recognition result in step 4130 in FIG. 4. Therefore, the processing proceeds to step 7030. On the other hand, in the case where the t3 is larger than t2, there is a possibility that the user satisfaction level becomes higher when performing some operation at the present moment. Therefore, the processing proceeds to step 7040.

In step 7030, the selection unit 1070 determines to wait for the second speech recognition result and performs the above-described processing of setting a flag. Thereafter, the selection unit 1070 terminates the processing illustrated in the flowchart in FIG. 7 and advances the processing to step 3090 in FIG. 3. In this case, after affirmative determination is made in step 3090, the selection unit 1070 returns to step 3010 and waits until reception of the second speech recognition result or elapse of a certain time again.

In step 7040, the selection unit 1070 determines whether the elapsed time t3 substantially deviates from the expected value. For example, a difference between the elapsed time t3 and the predicted value of the elapsed time t2 is obtained, and in the case where the difference exceeds a predetermined threshold value, the elapsed time t3 can be determined to substantially deviate from the expected value. Further, in a case where a range of values that can be taken by the elapsed time t2 is known in advance, whether the elapsed time t3 substantially deviates from the expected value may be determined by comparing the elapsed time t3 with the range. For example, in the case where the range of values that can be taken by the elapsed time t2 is stored in advance in the terminal device 100 with probability distribution such as normal distribution, the elapsed time t3 can be determined to substantially deviate from the expected value when the elapsed time t3 falls within a predetermined region of the probability distribution, for example, in a region of 5% from an upper limit value. As a result, the processing proceeds to step 7100 in the case where the elapsed time t3 substantially deviates from the expected value, otherwise the processing proceeds to step 7045.

In step 7045, the selection unit 1070 estimates the domain of the second engine, that is, the domain d2' corresponding to the unreceived second speech recognition result. Here, the domain d2' is assumed to be the same as the domain d1, and the same contents as the domain d1 may be set as it is, similarly to step 4095 in FIG. 4.

In step 7050, the selection unit 1070 calculates the estimated accuracy rate p2 of the second speech recognition result. Here, the estimated accuracy rate p2 is calculated by a similar method to the method in step 4110 in FIG. 4. That is, the selection unit 1070 calculates the estimated accuracy rate p2 using the preset function Fp2 on the basis of the output sources k1 and k2 set in step 4030 or 4040, the domain d2' estimated in step 7045, the reliability c1 estimated in step 4060, and the elapsed time t3 measured in step 7010. Note that, here, the elapsed time t3 at the present moment is used, unlike step 4110 in FIG. 4. Note that, in step 7050, all the variables k1, k2, d2', c1, t3 are not necessarily used. The estimated accuracy rate p2 can be calculated using any one or more of arbitrary variables.

In step 7060, the selection unit 1070 calculates a user satisfaction level with information provision of the case of using the second speech recognition result. Here, the user satisfaction levels Sa2' and Sc2' with the second speech recognition result are calculated for the adoption operation and the confirmation operation, similarly to step 4120 in FIG. 4. That is, the user satisfaction levels Sa2' and Sc2' are respectively calculated by substituting the variables of the domain d2' estimated in step 7045, the elapsed time t3 predicted in step 7010, and the estimated accuracy rate p2 calculated in step 7050 to the functions Fsa and Fsc on the basis of the variables. Note that, here, the elapsed time t3 at the present moment is used, similarly to step 7050. Note that, in step 7060, all the variables d2', t3, and p2 are not necessarily used.

In step 7070, the selection unit 1070 calculates the user satisfaction levels Sa1, Sc1, and Sr1 with the information provision of the case of using the received speech recognition result i1. Here, the user satisfaction levels Sa1, Sc1, and Sr1 by the adoption operation, the confirmation operation, and the rejection operation in the case of using the speech recognition result i1 can be respectively calculated by substituting the variables of the domain d1 estimated in step 4050, the elapsed time t3 measured in step 7010, and the estimated accuracy rate p1 calculated in step 4080 to the functions Fsa, Fsc, and Fsr, similarly to step 4090 in FIG. 4. Note that, in step 7070, all the variables d1, t3, and p1 are not necessarily used. The user satisfaction levels Sa1, Sc1, and Sr1 can be calculated using any one or more of arbitrary variables.

In the processing in and after step 7080, the selection unit 1070 compares the user satisfaction levels Sa1, Sc1, and Sr1 with the received speech recognition result i1 calculated in step 7070 with the user satisfaction levels Sa2' and Sc2' with the second speech recognition result calculated in step 7060. The selection unit 1070 determines whether to select the speech recognition result i1 as the speech recognition result to be used for the information provision to the user by the HMI control unit 1100 or whether to wait until reception of the second speech recognition result without selecting the speech recognition result i1 on the basis of a comparison result, similarly to the processing in and after step 4130 in FIG. 4. Further, in the case of selecting the speech recognition result i1, which of the adoption operation, the confirmation operation, and the rejection operation is used to perform the information provision to the user is determined.

In step 7080, the selection unit 1070 determines whether the user satisfaction level is higher when waiting for the second speech recognition result than when using the received speech recognition result i1. Specifically, the selection unit 1070 compares the maximum values of the user satisfaction levels Sa1, Sc1, and Sr1 with the speech recognition result i1 with the maximum values of the user satisfaction levels Sa2' and Sc2' with the second speech recognition result, similarly to step 4130 in FIG. 4. As a result, when the maximum values of the user satisfaction levels Sa2' and Sc2' are larger than the maximum values of the user satisfaction levels Sa1, Sc1, and Sr1, the selection unit 1070 determines that the user satisfaction levels are higher when waiting for the second speech recognition result and advances the processing to step 7090. On the other hand, when the maximum values of the user satisfaction levels Sa1, Sc1, and Sr1 are equal to or larger than the maximum values of the user satisfaction levels Sa2' and Sc2', the selection unit 1070 determines that the user satisfaction levels are higher when using the speech recognition result i1 that has been received at the present moment without waiting for the second speech recognition result and advances the processing to step 7100.

In step 7090, the selection unit 1070 determines to wait for the second speech recognition result and performs the above-described processing of setting a flag. Thereafter, the selection unit 1070 terminates the processing illustrated in the flowchart in FIG. 7 and advances the processing to step 3090 in FIG. 3. In this case, after affirmative determination is made in step 3090, the selection unit 1070 returns to step 3010 and waits until reception of the second speech recognition result or elapse of a certain time again.

In step 7100, the selection unit 1070 compares the user satisfaction level Sa1 in the adoption operation according to the speech recognition result i1 with the user satisfaction level Sc1 in the confirmation operation and the user satisfaction level Sr1 in the rejection operation. As a result, the processing proceeds to step 7110 when Sa1 is from Sc1 to Sr1, both inclusive, otherwise the processing proceeds to step 7120.

In step 7110, the selection unit 1070 selects the adoption operation as the method of the information provision to the user according to the speech recognition result i1. Thereafter, the selection unit 1070 terminates the processing illustrated in the flowchart in FIG. 7 and advances the processing to step 3090 in FIG. 3. In this case, the negative determination is made in step 3090, in step 3100, a command of performing the adoption operation is output from the selection unit 1070 to the HMI control unit 1100 on the basis of the speech recognition result i1. As a result, a screen such as the screen 2010 in FIG. 2(*a*) is displayed on the display 30, and the processing transitions to processing according to the recognized input operation.

In step 7120, the selection unit 1070 compares the user satisfaction level Sc1 in the confirmation operation according to the speech recognition result i1 with the user satisfaction level Sr1 in the rejection operation. As a result, the processing proceeds to step 7130 when Sc1 is equal to or larger than Sr1, otherwise the processing proceeds to step 7140, that is, when Sc1 is less than Sr1.

In step 7130, the selection unit 1070 selects the confirmation operation as the method of the information provision to the user according to the speech recognition result i1. Thereafter, the selection unit 1070 terminates the processing illustrated in the flowchart in FIG. 7 and advances the processing to step 3090 in FIG. 3. In this case, after the negative determination is made in step 3090, in step 3100, a command for performing the confirmation operation is output from the selection unit 1070 to the HMI control unit 1100 on the basis of the speech recognition result i1. As a result, a screen such as the screen 2020 in FIG. 2(*b*) or the screen 2030 in FIG. 2(*c*) is displayed on the display 30, and the processing transitions to processing according to the recognized input operation after waiting for confirmation by the user.

In step 7140, the selection unit 1070 selects the rejection operation as the method of the information provision to the user according to the speech recognition result i1. Thereafter, the selection unit 1070 terminates the processing illustrated in the flowchart in FIG. 7 and advances the processing to step 3090 in FIG. 3. In this case, after the negative determination is made in step 3090, in step 3100, a command for performing the rejection operation is output from the selection unit 1070 to the HMI control unit 1100. As a result, a screen such as the screen 2040 in FIG. 2(*d*) is displayed on the display 30, and the user is urged to speak again.

As described above, in the processing in and after step 7080, the user satisfaction levels Sa1, Sc1, and Sr1 with the received speech recognition result i1 are compared with the user satisfaction levels Sa2' and Sc2' with the second speech recognition result, and the operation with the highest user satisfaction level is selected on the basis of the comparison result.

According to the above-described embodiment of the present invention, the following functions and effects are exerted.

(1) The terminal device 100 as a speech recognition apparatus includes a speech detection unit, that is, the speech section detection unit 1010 that detects the speech input from the user, an information providing unit, that is, the HMI control unit 1100 that performs the information provision to the user using either the terminal speech recognition information based on the speech recognition result by the speech recognition unit 1040 or the server speech recognition information based on the speech recognition result by the speech recognition unit 1250 different from the terminal speech recognition unit, and the selection unit 1070. The selection unit 1070 executes the processing illustrated in the flowcharts in FIGS. 3 to 7, thereby selecting either one of the speech recognition information as the speech recognition information to be used by the HMI control unit 1100 on the basis of the elapsed time from the input of the speech and changing the method of the information provision by the HMI control unit 1100. With the configuration, the speech input function comfortable for the user can be realized.

(2) The selection unit 1070 calculates the user satisfaction level indicating the predicted value of the degree of satisfaction of the user with the information provision of the case of using the first speech recognition information and the user satisfaction level indicating the predicted value of the degree of satisfaction of the user with the information provision of the case of using the second speech recognition information on the basis of the elapsed time t1, t2, or t3 from the input of the speech in steps 4090 and 4120, steps 5160 and 5170, or steps 7070 and 7060. Then, the selection unit 1070 compares the user satisfaction levels and selects either the first speech recognition information or the second speech recognition information on the basis of the comparison result in step 4130, steps 5180, 5200, 5220, and 5240, or step 7080. With the configuration, either speech recognition information can be appropriately selected.

(3) In the case where the first speech recognition information has been acquired first and the second speech recognition information has not been acquired yet, the selection unit 1070 executes the determination routine of the first result new arrival according to the flowchart in FIG. 4. In this processing, the selection unit 1070 measures the elapsed time t1 regarding the elapsed time from the input of the speech to the obtainment of the first speech recognition information (step 4070), and predicts the elapsed time t2 regarding the elapsed time from the input of the speech to the obtainment of the second speech recognition information (step 4100). Then, the selection unit 1070 calculates the user satisfaction levels Sa1, Sc1, and Sr1 with the information provision of the case of using the first speech recognition information on the basis of the measured elapsed time t1 (step 4090) and calculates the user satisfaction levels Sa2' and Sc2' with the information provision in the case of using the second speech recognition information on the basis of the predicted elapsed time t2 (step 4120). Thereafter, the selection unit 1070 compares the calculated user satisfaction levels Sa1, Sc1, and Sr1 with user satisfaction levels Sa2' and Sc2' (step 4130) and determines whether to select the first speech recognition information on the basis of the comparison result (steps 4140 to 4170). With the configuration, whether to select the first speech recognition information or whether to wait for the second speech recognition information can be appropriately determined in consideration of the satisfaction level of the user.

(4) In the case where the first speech recognition information has been acquired and the second speech recognition information has not been acquired yet, the selection unit 1070 executes the determination routine of the one result arrival according to the flowchart in FIG. 7. In this processing, the selection unit 1070 measures the elapsed time t3 regarding the elapsed time from the input of the speech to the present (step 7010), and calculates the user satisfaction levels Sa1, Sc1, and Sr1 with the information provision of the cause of using the acquired speech recognition information and the user satisfaction levels Sa2' and Sc2' with the information provision of the case of using the second speech recognition information on the basis of the measured elapsed time t3 (steps 7070 and 7060). Thereafter, the selection unit 1070 compares the calculated user satisfaction levels Sa1, Sc1, and Sr1 with user satisfaction levels Sa2' and Sc2' (step 7080) and determines whether to select the acquired speech recognition information on the basis of the comparison result (steps 7090 to 7140). With the configuration, whether to select the acquired speech recognition information or whether to wait for the second speech recognition information can be appropriately determined in consideration of the satisfaction level of the user.

(5) In the case where the first speech recognition information has been acquired first and the second speech recognition information has been acquired later, the selection unit 1070 executes the determination routine of the second result new arrival according to the flowchart in FIG. 5. In this processing, the selection unit 1070 measures the elapsed time t2 regarding the elapsed time from the input of the speech to the obtainment of the second speech recognition information (step 5040), and calculates the user satisfaction levels Sa1, Sc1, and Sr1 with the information provision of the cause of using the first speech recognition information and the user satisfaction levels Sa2' and Sc2' with the information provision of the case of using the second speech recognition information on the basis of the measured elapsed time t2 (steps 5160 and 5170). Thereafter, the selection unit 1070 compares the calculated user satisfaction levels Sa1, Sc1, and Sr1 with user satisfaction levels Sa2 and Sc2 (steps 5180, 5200, 5220, and 5240) and selects either the first speech recognition information or the second speech recognition information on the basis of the comparison result (steps 5190, 5210, 5230, and 5250). With the configuration, whether to select either the first speech recognition information or the second speech recognition information can be appropriately determined in consideration of the satisfaction level of the user.

(6) The selection unit 1070 calculates the user satisfaction levels with the first speech recognition information and the user satisfaction levels with the second speech recognition information on the basis of at least one of the domain d1 and the domain d2 respectively corresponding to the first speech recognition information and the second speech recognition information of a plurality of domains set in advance according to the attributes of the speech, and the estimated accuracy rate p1 and the estimated accuracy rate p2 obtained respectively corresponding to the first speech recognition information and the second speech recognition information, in steps 4090 and 4120, steps 5160 and 5170, or steps 7070 and 7060. With the configuration, the user satisfaction level can be appropriately calculated.

(7) At least one of the speech recognition unit 1040 and the speech recognition unit 1250 recognizes the speech using any one of a plurality of dictionary data recorded in advance in the dictionary database 1050 or 1260. The selection unit 1070 may estimate at least one of the domain d1 and the domain d2 on the basis of the dictionary data used for recognition of the speech by at least one of the speech recognition unit 1040 and the speech recognition unit 1250, in steps 4050 and 5020. In this way, the domains d1 and d2 can be easily estimated.

(8) At least one of the first speech recognition information and the second speech recognition information can include the intention estimation information indicating the estimation result of the intention of the user to the speech. In this case, the selection unit 1070 may estimate at least one of the domain d1 and the domain d2 on the basis of the intention estimation information in steps 4050 and 5020. In this way, the domains d1 and d2 can be easily estimated.

(9) The selection unit 1070 determines the estimated accuracy rate p1 and the estimated accuracy rate p2 on the basis of at least one of the domain d1 and the domain d2, the reliability c1 to the first speech recognition information and the reliability c2 to the second speech recognition information, and the elapsed time t1 and the elapsed time t2 from the input of the speech in steps 4080 and 5050. With the configuration, the estimated accuracy rate p1 and the estimated accuracy rate p2 can be accurately determined.

(10) The selection unit 1070 selects any one of the adoption operation to adopt the input operation based on either the first speech recognition information or the second speech recognition information as the input operation of the user, the confirmation operation to adopt the input operation based on either the first speech recognition information or the second speech recognition information as the input operation of the user after confirmation of the user, and the rejection operation to reject both the input operation based on the first speech recognition information and the input operation based on the second speech recognition information without adoption, and changes the method of information provision by the HMI control unit 1100 according to the selected operation in steps 4180, 5120, 5190, 5210, and 7110, steps 4190, 5140, 5230, 5250, and 7130, or steps 4160, 5150, 5260, 6060, and 7140. With the configuration, the information provision to the user can be performed by an appropriate method according to a situation.

(11) The speech recognition system 1 includes the terminal device 100 and the server 200. The terminal device 100 includes a speech detection unit, that is, the speech section detection unit 1010 that detects the speech input from the user, the speech recognition unit 1040 that executes the speech recognition processing for recognizing the detected speech and outputs the terminal speech recognition information based on the recognition result of the speech, the communication control unit 1030 that transmits the speech information based on the detected speech to the server 200 and receives the server speech recognition information transmitted from the server 200, an information providing unit, that is, the HMI control unit 1100 that performs the information provision to the user using either the terminal speech recognition information or the server speech recognition information, and the selection unit 1070 that selects either the speech recognition information on the basis of the elapsed time from the input of the speech and changes the method of the information provision by the HMI control unit 1100. The server 200 includes the communication control unit 1210 that receives the speech information transmitted from the terminal device 100 and transmits the server speech recognition information to the terminal device 100, and the speech recognition unit 1250 that executes the speech recognition processing for recognizing the speech on the basis of the received speech information and outputs the server speech recognition information based on the recognition result of the speech. With the configuration, the speech input function comfortable for the user can be realized by the speech recognition system 1.

First Modification

Next, a first modification of the present invention will be described. In the above-described embodiment, the description has been made such that the estimated values such as the estimated accuracy rates p1 and p2, the user satisfaction levels, the predicted value of the elapsed time t2 to the obtainment of the unreceived second speech recognition result can be uniquely determined by determining the variables. However, in reality, these estimated values vary and the variables used for determining the estimated values also vary. Therefore, in the first modification, an example of obtaining most likely estimated values in consideration of various variations by expressing functions and variables for obtaining the estimated values by probability distribution will be described. Note that, in the following description, a case of obtaining each estimated value on the basis of probability distribution in a determination routine of first result new arrival illustrated in the flowchart in FIG. 4 will be described. However, the estimated values are similarly obtained in other determination routines.

First, in step 4080 in FIG. 4, the selection unit 1070 calculates the estimated accuracy rate p1 of the speech recognition result i1 using a probability density function pp instead of the function Fp described in the embodiment. The probability density function pp is a function indicating probability density of values that can be taken by the estimated accuracy rate p1, and its functional form is defined by variables of k1, d1, c1, and t1. When the probability density function pp is used, the most likely estimated accuracy rate p1 is obtained as an expected value of the probability density function pp, for example, by the following expression (1).

$$p_1 = E[p_p] = \int p'_1 \cdot p_p(p'_1, d_1, c_1, t_1) \cdot dp'^1. \quad (1)$$

Furthermore, in step 4090, the selection unit 1070 can also obtain the user satisfaction levels Sa1, Sc1, and Sr1 for operations with information provision in the case of using the speech recognition result i1 as stochastic values. For example, the user satisfaction levels Sa1, Sc1, and Sr1 can be obtained by the following expressions (2) to (4) using probability density functions psa, psc, and psr instead of the functions Fsa, Fsc, and Fsr respectively corresponding to the adoption operation, the confirmation operation, and the rejection operation.

$$S_{a1}=E[p_{sa}]=\iint S_{a1} p_{sa}(S'_{a1},d_1,c_1,p_1) \cdot p'_1 \cdot p_p(p'_1,d_1,c_1,t_1) \cdot dp'_1 dS'_{a1} \quad (2)$$

$$S_{c1}=E[p_{sc}]=\iint S'_{c1} p_{sc}(S'_{c1},d_1,c_1,p_1) \cdot p'_1 \cdot p_p(p'_1,d_1,c_1,t_1) \cdot dp'_1 dS'_{c1} \quad (3)$$

$$S_{r1}=E[p_{sr}]=\iint S'_{r1} p_{sr}(S'_{r1},d_1,c_1,p_1) \cdot p'_1 \cdot p_p(p'_1,d_1,c_1,t_1) \cdot dp'_1 dS'_{r1} \quad (4)$$

The more likely user satisfaction levels can be calculated in light of the variation in the estimated accuracy rate p1 by expressing the estimated accuracy rate p1 as probability distribution without uniquely determining the estimated accuracy rate p1, as in the above expressions (2) to (4).

Note that the method of calculating the stochastic estimated values as described above can exhibit higher effect when obtaining each estimated value of a second engine, that is, each estimated value regarding a second speech recognition result. The reason for this is that each estimated value regarding the second speech recognition result needs to be obtained on the basis of the first speech recognition result. Note that the estimated values regarding the second speech recognition result are the above-described elapsed time t2, estimated accuracy rate p2, and domain d2'.

First, in step 4095 in FIG. 4, the selection unit 1070 estimates the domain corresponding to the second speech recognition result. In the embodiment, this domain is estimated as the domain d2' that is the same as the domain d1 corresponding to the first speech recognition result i1. However, strictly speaking, the domain corresponding to the second speech recognition result may be different from the domain d1. Therefore, in the first modification, the domain corresponding to the second speech recognition result is d2, and a probability Pd of the domain d2 under a certain situation is expressed by the following expression (5).

$$p_d(d_2|d_1,c_1,t_1,p_1) \quad (5)$$

Next, in step 4100, the selection unit 1070 measures the elapsed time t2 from when the user finishes utterance and the speech is input to the terminal device 100 to when the unreceived second speech recognition result is obtained. When a probability of the elapsed time t2 is expressed by a probability density function pt, an expected value of the elapsed time t2 is expressed by the following expression (6).

$$t_2=E[p_t]=\int t'_2 \cdot p_t(t'_2,d_2,k_2,c_1,c_s) \cdot dt'_2 \quad (6)$$

Here, the probability Pd of the domain d2 in the above expression (6) is expressed by the aforementioned expression (5). Further, the estimated accuracy rate p1 in the expression (5) is expressed by the aforementioned expression (1). Therefore, the expression (6) is modified and the expected value of the elapsed time t2 is expressed by the following expression (7). Note that D represents an entire set of domains that can be taken by the domain d2 in the expression (7).

$$t_2=E[p_t]=\Sigma_{d'2 \in D} \{\iint p_d(d'_2|d_1,c_1,t_1,p_1) \cdot t'_2 \cdot p_t(t_2,d_2,k_2,c_1,c_s) \cdot p'_1 \cdot p_p(p'_1,d_1,c_1,t_1) \cdot dp'_1 dt'_2\} \quad (7)$$

Note that the estimated accuracy rate p2 of the second speech recognition result and the user satisfaction levels with the information provision of the case of using the second speech recognition result can be similarly calculated to the estimated accuracy rate p1 and the user satisfaction levels of the first speech recognition result i1 on the basis of the above-described elapsed time t2 and domain d2.

In the first modification, as described above, the estimated values of the user satisfaction levels and the elapsed time t2 are calculated in consideration of the stochastic variations of the estimated values. As a result, information provision with high usability can be performed in a situation with many uncertainties.

Second Modification

Next, a second modification of the present invention will be described. In the above embodiment, the example of performing the information provision to the user by performing any of the adoption operation, the confirmation operation, and the rejection operation using either the speech recognition result obtained in the terminal device 100 or the speech recognition result obtained in the server 200 has been described. In contrast, in the second modification, an example of performing information provision to the user using either an intention estimation result obtained in the terminal device 100 or an intention estimation result obtained in the server 200 will be described. Note that, as described in the embodiment, the terminal device 100 performs intention estimation of the user by the intention estimation unit 1060 and the server 200 performs intention estimation of the user by the intention estimation unit 1270. It is assumed that the terminal speech recognition information and the server speech recognition information to be input to the selection unit 1070 include the respective intention estimation results.

Note that the intention of the user estimated in the intention estimation units 1060 and 1270 indicates what type of input operation to the terminal device 100 the contents uttered by the user intends. For example, in the case where the terminal device 100 provides navigation information to the user, facility name search, home route search, telephone call, map enlargement, map reduction, and the like are estimated as intentions of the user. Further, in the facility search, a query or the like in the facility search may be estimated. The intention estimation units 1060 and 1270 can estimate the intentions of the user from the speech recognition results by a well-known method using predetermined rules, statistical methods, or the like.

Figure 5:
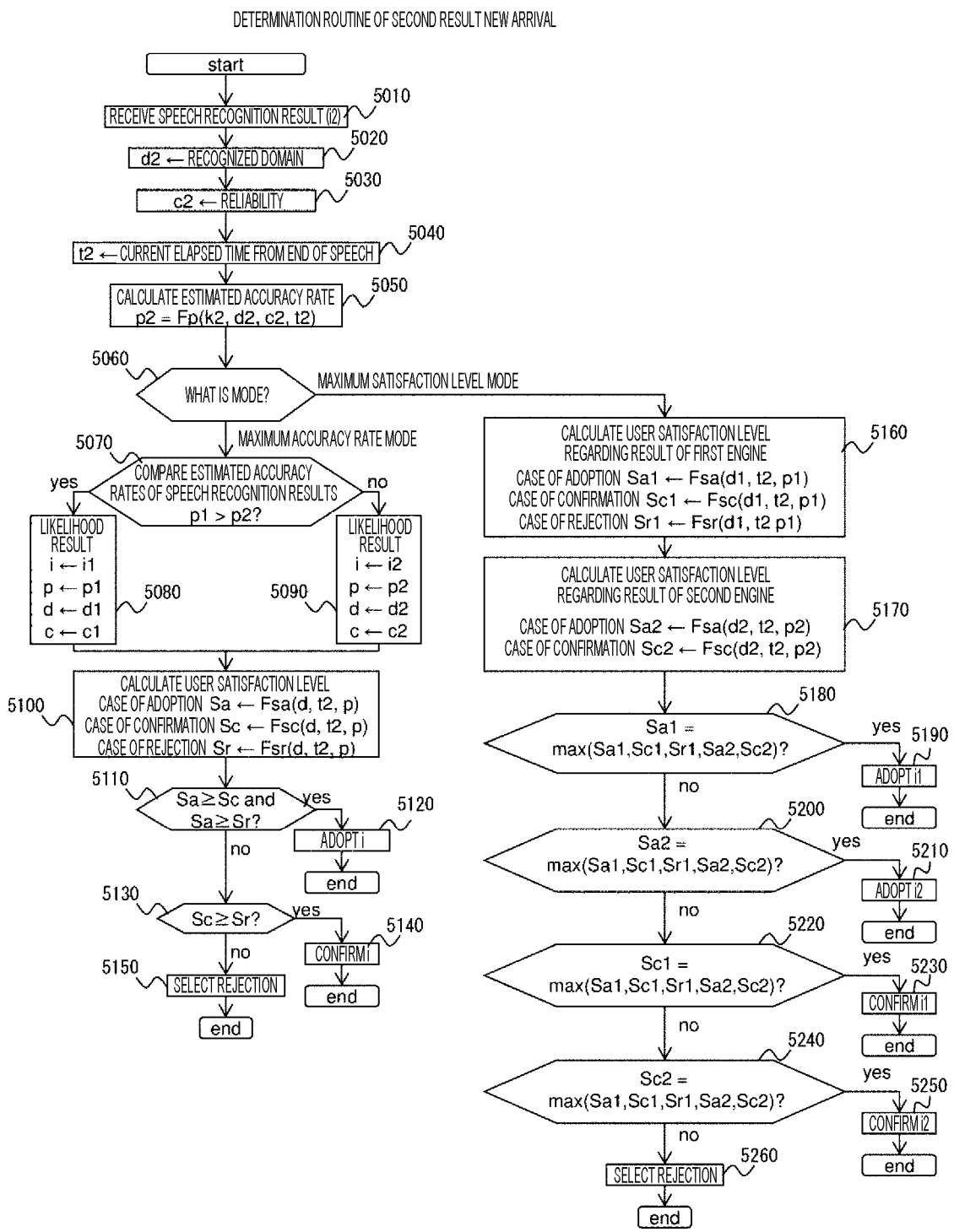
FIG. 5 is a flowchart illustrating a determination routine of second result new arrival.

In step 4010 in FIG. 4 and step 5010 in FIG. 5, the selection unit 1070 can use the intentions of the user estimated by the intention estimation unit 1060 or 1270 instead of the speech recognition results i1 and i2. Reliability indicating a likelihood of intention estimation may be given to these intentions. Further, as reliability based on both the reliability of the speech recognition result and the reliability of the intention estimation result, reliability obtained by multiplying or adding the aforementioned reliabilities may be used. In this way, processing can be performed in consideration of both the likelihood of the speech recognition and the likelihood of the intention estimation.

According to the above-described second modification of the present invention, the terminal speech recognition information and the server speech recognition information include the intention estimation information indicating estimation results of the intention of the user to the speech. The selection unit 1070 selects the intention estimation information included in either speech recognition information. With the configuration, the information provision considering the intention of the user can be performed.

Third Modification

Next, a third modification of the present invention will be described. In the above embodiment, the example of estimating the domains on the basis of the speech recognition results and the intention estimation results for the speech uttered just before by the user has been described. However, in reality, the frequently used domains tend to be constant in each user. In addition, the domains used by the user in the series of input operations are roughly constant, and it is rare to suddenly utter speech corresponding to a different domain. Therefore, the domain this time may be estimated on the basis of an estimation history of past domains. In this case, the terminal device 100 accumulates the estimation history of past domains in the user satisfaction level storage unit 1080 as data regarding user satisfaction levels. With the accumulation, the selection unit 1070 can estimate the domain d1 corresponding to the first speech recognition result i1 and the domain d2 corresponding to the second speech recognition result i2 on the basis of the estimation history of past domains in step 4050 in FIG. 4 or in step 5020 in FIG. 5.

According to the above-described third modification of the present invention, the selection unit 1070 estimates the domain d1 and the domain d2 on the basis of the estimation history of the past domain d1 and domain d2 in step 4050 or 5020. With the configuration, the domains can be more accurately estimated in consideration of the tendency of the user or the series of input operations.

Note that, in the above-described embodiment and modifications of the present invention, the example in which the speech recognition is performed in the speech recognition unit 1040 included in the terminal device 100 and the speech recognition unit 1250 included in the server 200, and the speech recognition results are selected by the selection unit 1070 has been described. However, the present invention is not limited to such an embodiment. For example, the terminal device 100 can be connected to a plurality of servers, and speech recognition results obtained in the respective servers may be acquired and selected by the terminal device 100. In this case, the terminal device 100 may not include the speech recognition unit 1040. Alternatively, the terminal device 100 may include a plurality of speech recognition units and select speech recognition results obtained in the respective speech recognition units.

The above-described embodiment and various modifications are merely examples, and the present invention is not limited to these contents as long as the characteristics of the invention are not impaired. Note that the present invention is not limited to the above-described embodiment and modifications, and various modifications can be made without departing from the spirit of the present invention.

The disclosed content of the following priority application is incorporated herein as reference.

Japanese Patent Application No. 2016-222723 (filed on Nov. 15, 2016)

REFERENCE SIGNS LIST 1 speech recognition system
100 terminal device
200 server
1010 speech section detection unit
1020 speech encoding unit
1030 communication control unit
1040 speech recognition unit
1050 dictionary database
1060 intention estimation unit
1070 selection unit
1080 user satisfaction level storage unit
1100 HMI control unit
1110 speech output device
1120 recorded speech synthesis unit
1130 regular speech synthesis unit
1210 communication control unit
1220 speech dialog control unit
1230 dialog scenario
1240 speech decoding unit
1250 speech recognition unit
1260 dictionary database
1270 intention estimation unit

The invention claimed is:

1. A speech recognition apparatus comprising:
a speech detection unit configured to detect a speech input by a user;
an information providing unit configured to perform information provision to the user, using either first speech recognition information based on a recognition result of the speech by a first speech recognition unit or second speech recognition information based on a recognition result of the speech by a second speech recognition unit different from the first speech recognition unit; and
a selection unit configured to:
calculate a first user satisfaction level indicating a predicted value of a degree of satisfaction of the user with the information provision of a case of using the first speech recognition information, and calculate a second user satisfaction level indicating a predicted value of a degree of satisfaction of the user with the information provision of a case of using the second speech recognition information, on the basis of an elapsed time from the input of the speech to: acquisition of the first speech recognition information by the selection unit, acquisition of the second speech recognition information by the selection unit, or present, and
compare the first user satisfaction level with the second user satisfaction level to obtain a comparison result, and
select either the first speech recognition information or the second speech recognition information as speech recognition information to be used by the information providing unit on the basis of the comparison result.

2. The speech recognition apparatus according to claim 1, wherein,
in a case where the first speech recognition information has been acquired first and the second speech recognition information has not been acquired yet, the selection unit
measures a first elapsed time regarding an elapsed time from the input of the speech to the acquisition of the first speech recognition information, and predicts a second elapsed time regarding an elapsed time from the input of the speech to acquisition of the second speech recognition information,
calculates the first user satisfaction level on the basis of the measured first elapsed time,
calculates the second user satisfaction level on the basis of the predicted second elapsed time, and
compares the calculated first user satisfaction level with the calculated second user satisfaction level, and determines whether to select the first speech recognition information on the basis of a comparison result.

3. The speech recognition apparatus according to claim 1, wherein,
in a case where the first speech recognition information has been already acquired and the second speech recognition information has not been acquired yet, the selection unit
measures a third elapsed time regarding an elapsed time from the input of the speech to present,
calculates the first user satisfaction level and the second user satisfaction level on the basis of the measured third elapsed time, and
compares the calculated first user satisfaction level with the calculated second user satisfaction level, and determines whether to select the first speech recognition information on the basis of a comparison result.

4. The speech recognition apparatus according to claim 1, wherein,
in a case where the first speech recognition information has been acquired first and the second speech recognition information has been acquired second, the selection unit
measures a second elapsed time regarding an elapsed time from the input of the speech to the acquisition of the second speech recognition information,
calculates the first user satisfaction level and the second user satisfaction level on the basis of the measured second elapsed time, and
compares the calculated first user satisfaction level with the calculated second user satisfaction level, and determines whether to select either the first speech recognition information or the second speech recognition information on the basis of a comparison result.

5. The speech recognition apparatus according to claim 1, wherein
the selection unit further calculates the first user satisfaction level and the second user satisfaction level on the basis of at least one of a first domain and a second domain respectively corresponding to the first speech recognition information and the second speech recognition information, of a plurality of domains determined in advance according to attributes of the speech, and a first estimated accuracy rate and a second estimated accuracy rate obtained respectively corresponding to the first speech recognition information and the second speech recognition information.

6. The speech recognition apparatus according to claim 5, wherein
at least one of the first speech recognition unit and the second speech recognition unit recognizes the speech, using any one of a plurality of dictionary data, and
the selection unit estimates at least one of the first domain and the second domain on the basis of the dictionary data used by the at least one of the first speech recognition unit and the second speech recognition unit for the recognition of the speech.

7. The speech recognition apparatus according to claim 5, wherein
at least one of the first speech recognition information and the second speech recognition information includes intention estimation information indicating an estimation result of an intention of the user with respect to the speech, and
the selection unit estimates at least one of the first domain and the second domain on the basis of the intention estimation information.

8. The speech recognition apparatus according to claim 5, wherein
the selection unit estimates the first domain and the second domain on the basis of an estimation history of the past first domain and the past second domain.

9. The speech recognition apparatus according to claim 5, wherein
the selection unit determines the first estimated accuracy rate and the second estimated accuracy rate on the basis of at least one of the first domain and the second domain, reliability with respect to the first speech recognition information and reliability with respect to the second speech recognition information, and the elapsed time from the input of the speech.

10. The speech recognition apparatus according to claim 1, wherein
each of the first speech recognition information and the second speech recognition information includes intention estimation information indicating an estimation result of an intention of the user with respect to the speech, and
the selection unit selects the intention estimation information included in either the first speech recognition information or the second speech recognition information.

11. The speech recognition apparatus according to claim 1, wherein
the selection unit selects any one of
an adoption operation to adopt an input operation based on either the first speech recognition information or the second speech recognition information as an input operation of the user,
a confirmation operation to adopt an input operation based on either the first speech recognition information or the second speech recognition information as an input operation of the user after confirmation of the user, and
a rejection operation to reject both the input operation based on the first speech recognition information and the input operation based on the second speech recognition information without adoption, and
changes the method of information provision according to the selected operation.

12. A speech recognition system including a terminal device and a server,
the terminal device comprising:
a speech detection unit configured to detect a speech input by a user;
a first speech recognition unit configured to execute speech recognition processing for recognizing the speech and output first speech recognition information based on a recognition result of the speech;
a first communication control unit configured to transmit speech information based on the speech to the server and receive second speech recognition information transmitted from the server;
an information providing unit configured to perform information provision to the user, using either the first speech recognition information or the second speech recognition information; and
a selection unit configured to:
calculate a first user satisfaction level indicating a predicted value of a degree of satisfaction of the user with the information provision of a case of using the first speech recognition information, and calculate a second user satisfaction level indicating a predicted value of a degree of satisfaction of the user with the information provision of a case of using the second speech recognition information, on the basis of an elapsed time from the input of the speech to: acquisition of the first speech recognition information by the selection unit, acquisition of the second speech recognition information by the selection unit, or present, and compare the first user satisfaction level with the second user satisfaction level to obtain a comparison result, and select either the first speech recognition information or the second speech recognition information to be used by the information providing unit on the basis of the comparison result, and the server comprising:

a second communication control unit configured to receive the speech information transmitted from the terminal device and transmit the second speech recognition information to the terminal device; and a second speech recognition unit configured to execute speech recognition processing for recognizing the speech on the basis of the speech information and output the second speech recognition information based on a recognition result of the speech.

* * * * *